United States Patent
Czelnik et al.

(10) Patent No.: US 10,585,481 B2
(45) Date of Patent: Mar. 10, 2020

(54) OPERATING DEVICE WITH FAST HAPTIC FEEDBACK

(71) Applicant: VOLKSWAGEN AKTIENGESELLSCHAFT, Wolfsburg (DE)

(72) Inventors: Mark Peter Czelnik, Wolfsburg (DE); Michael Klaas, Schwülper (DE); Carsten Rieger, Lengede (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 15/576,834

(22) PCT Filed: May 25, 2016

(86) PCT No.: PCT/EP2016/061758
§ 371 (c)(1),
(2) Date: Nov. 26, 2017

(87) PCT Pub. No.: WO2016/189017
PCT Pub. Date: Dec. 1, 2016

(65) Prior Publication Data
US 2018/0348865 A1 Dec. 6, 2018

(30) Foreign Application Priority Data
May 26, 2015 (DE) .................. 10 2015 209 593

(51) Int. Cl.
*G06F 3/01* (2006.01)
*B60K 37/06* (2006.01)
(Continued)

(52) U.S. Cl.
CPC .............. *G06F 3/016* (2013.01); *B60K 37/06* (2013.01); *G06F 3/0416* (2013.01);
(Continued)

(58) Field of Classification Search
None
See application file for complete search history.

(56) References Cited

U.S. PATENT DOCUMENTS

| 8,269,726 B2 | 9/2012 | Prados .................. 345/173 |
| 8,330,713 B2 | 12/2012 | Stelandre et al. ............ 345/111 |

(Continued)

FOREIGN PATENT DOCUMENTS

| DE | 102015209593 A1 | 7/1916 | ............. G06F 3/041 |
| DE | 20180024 U1 | 11/2001 | ............... G06F 1/16 |

(Continued)

OTHER PUBLICATIONS

International Search Report and Written Opinion, Application No. PCT/EP2016/061758, 8 pages, dated Aug. 29, 2016.
(Continued)

*Primary Examiner* — Brian M Butcher
(74) *Attorney, Agent, or Firm* — Slayden Grubert Beard PLLC

(57) ABSTRACT

The invention relates to operating devices for a vehicle with haptic feedback comprising a touch-sensitive position detection device (30) for determining touch positions as input parameters on a touch surface (31) of the touch-sensitive position detection device (30); an actuator device (50), coupled to the touch-sensitive position detection device (30), for generating the haptically detectable feedback on the touch surface (31); and an operating logic (1030) which is designed to execute a triggering of functions and/or vehicle systems depending on detected input parameters, wherein the touch-sensitive position detection device (30) and the actuator device (50) are designed with a haptic control device (100) in an operating device (2), and the operating logic (1030) is designed in a central control unit (330), (Continued)

which is designed separately from the operating device (2) and coupled in terms of information technology with the operating device (2), and detected input parameters are transmitted to the central control unit (330) as well as to the haptic control device (100), wherein the haptic control device (100) comprises a memory device (133) in which multiple different templates (401-404) are stored, wherein the multiple templates (401-404) each comprise at least one trigger condition for a haptic feedback, and the operating logic (1030) is designed to transmit a template signal for selecting or generating a current template to the haptic control device (100), and wherein the haptic control device (100) has a comparison device (140) which compares the detected input parameters touched during a user input in the operating device (2) via the operating device (2) with the at least one trigger condition of the current template in order to determine whether the detected input parameters satisfy the at least one trigger condition, and the haptic control device (100) is designed to control the actuator device (50) for generating the haptic feedback if the comparison device (140) has identified the satisfaction of the at least one trigger condition. The invention also relates to a method for detecting user inputs.

17 Claims, 12 Drawing Sheets

(51) Int. Cl.
*G06F 3/041* (2006.01)
*G06F 3/16* (2006.01)
(52) U.S. Cl.
CPC .................. *B60K 2370/143* (2019.05); *B60K 2370/1438* (2019.05); *B60K 2370/158* (2019.05); *G06F 3/167* (2013.01); *G06F 2203/014* (2013.01); *G06F 2203/04105* (2013.01); *G09G 2380/10* (2013.01)

(56) References Cited

U.S. PATENT DOCUMENTS

| | | | |
|---|---|---|---|
| 9,310,949 B2 | 4/2016 | Kaiser et al. | |
| 2006/0255683 A1* | 11/2006 | Suzuki | G05G 1/10 310/317 |
| 2009/0322496 A1* | 12/2009 | da Costa | G06F 3/016 340/407.2 |
| 2010/0156818 A1* | 6/2010 | Burrough | G06F 3/016 345/173 |
| 2010/0277429 A1* | 11/2010 | Day | G06F 3/0416 345/173 |
| 2011/0248946 A1 | 10/2011 | Michaelis et al. | 345/174 |
| 2014/0092003 A1* | 4/2014 | Liu | G06F 3/016 345/156 |

FOREIGN PATENT DOCUMENTS

| | | | |
|---|---|---|---|
| DE | 10324580 A1 | 12/2004 | ............. B60K 35/00 |
| DE | 102006012147 A1 | 3/2007 | ............. B60R 11/02 |
| DE | 102006047893 A1 | 6/2007 | ............... G06F 3/00 |
| DE | 102008040755 A1 | 2/2010 | ............. B60R 16/02 |
| DE | 102010012247 A1 | 9/2011 | ............... G01B 7/00 |
| DE | 102011016391 A1 | 12/2011 | ............. G06F 3/033 |
| EP | 2026174 B1 | 2/2009 | ............. G06F 3/041 |
| FR | 2953304 A1 | 6/2011 | ............. B60K 37/00 |
| JP | 2005216110 A | 8/2005 | ............. B60R 16/02 |
| KR | 20140105027 A | 8/2014 | ............... B60Q 1/14 |
| WO | 2016/189017 A1 | 12/2016 | ............. B60K 37/06 |

OTHER PUBLICATIONS

German Search Report, Application No. 102015209593.2, 5 pages, dated Apr. 16, 2018.

* cited by examiner

OPERATING DEVICE WITH FAST HAPTIC FEEDBACK

CROSS-REFERENCE TO RELATED APPLICATIONS

This application claims priority to German Patent Application No. 10 2015 209 593.2, filed on May 26, 2015 with the German Patent and Trademark Office, the contents of which application are hereby incorporated by reference in their entireties.

TECHNICAL FIELD

The invention relates to a touch-sensitive operating device with a touch-sensitive position-detecting apparatus, wherein the operating device generates a haptic acknowledgment upon being touched. In particular, the invention relates to an operating device that has an operating apparatus and a central control apparatus designed separate therefrom that is coupled by information technology, wherein the touch-sensitive position detecting apparatus is designed with an actuator apparatus for generating the haptic acknowledgment in the operating device.

In modern motor vehicles, there are a plurality of functions and vehicle systems to operate. Since installation space within a vehicle is limited and a single operating element assigned to special functions and the vehicle system cannot be designed and arranged for each vehicle system and function, it is currently routine to operate, or render operable, a plurality of such vehicle systems and operating functions by means of a multifunctional display and operating device. Such multifunctional display and operating devices which are typically arranged in a central console of a motor vehicle generally comprise a freely-programmable display surface, and physically-designed operating elements such as push buttons, rotary encoders, etc. arranged adjacent to the display surface. By means of a graphic display on the freely-programmable display surface, the individual physically-designed operating elements can be graphically displayed in functions assigned to various display and operating contexts. Such graphic displays are termed operating element assignments.

To further enhance variability, touch-sensitive position detection apparatuses are known in motor vehicles that can detect a touch position of an actuating element. Various locations or areas on the touch surface can be assigned different functions and/or functionalities. The assignment can for example be performed using printed information. In some examples of these display and operating apparatuses, the touch-sensitive position detection device is assigned a freely-programmable graphic display surface of a display device. Positions on a touch surface of the touch-sensitive position detection apparatus correspond with positions on the graphic display surface. If the touch surface of the touch-sensitive position detection apparatus is designed transparent and arranged in front of the display surface, the combination of the freely-programmable display surface and the touch-sensitive position detection apparatus is termed a touchscreen. A touch-sensitive position detection apparatus that is not arranged in front of a freely-programmable display surface is also termed a touchpad.

Whereas a user obtains haptic feedback upon touching a physically-designed operating element such as a pushbutton once a stop is reached or a trigger mechanism snaps back, which also enables blind operation of pushbuttons in particular in motor vehicles, such a haptic feedback which is also termed a haptic acknowledgment or response is not realized in routine touchscreens.

BACKGROUND

However, developments are known from the prior art in which an actuator is coupled to the touch-sensitive position detecting apparatus and/or the touch screen. The actuator causes a mechanical vibration or deflection to generate a palpable, i.e., haptically perceptible acknowledgment, or respectively haptically perceptible, acknowledgment.

DE 103 24 580 A1 describes an operating device for controlling systems in a motor vehicle by entries from a user via a touch-sensitive operating field on which two interchangeable surface shapes can be displayed, wherein the first surface shape is structured to be tactilely perceptible so that zones on the operating field can be selected to choose menu items therewith. The surface of the operating field is designed as an elastic film which is connected unreleasably to the operating field in the region of the selectable zones and the edge of the operating field, and moreover lies on the operating field so that the first tactilely perceptible structured surface shape of the operating field can be created with a medium by filling the gap between the film and operating field, and this structured surface shape can transition into the second flat surface shape by draining the medium from the gap between the film and operating field. If the operating field has the second flat surface, written entries on the operating field are possible.

DE 10 2006 012 147 A1 describes an entry device, in particular for a motor vehicle, wherein the input device comprises a housing, a display device arranged in the housing for optically depicting information, a touch-sensitive position detection apparatus arranged over the display device for entering commands by touching the touch surface, and an actuator for moving the touch-sensitive position detection apparatus or the housing in at least one direction, wherein the housing can be moved relative to the display apparatus. Such an apparatus can provide haptic acknowledgment upon a user entry.

Given the number of available vehicle functions in a vehicle and the rising complexity in the provided functions as well as the restricted installation space, operating devices are known in which the operating apparatus responsible for actual user entry detection is designed separate from a central control apparatus. The operating apparatus and the central control apparatus are coupled to each other by information technology and interact to provide the functionality of the operating device. The central control apparatus can be designed so that it provides functions that go beyond providing the user interface for detecting user entries, and assumes central control tasks for vehicle functions. An operating logic of the user interface provided by the operating device is designed in the central control unit. For complex vehicle functions as well, it is accordingly possible to provide a user interface that depends on the respective function status. However, satisfactory haptic acknowledgment is not yet achieved since the central control apparatus frequently manifests a long processing time for the entry parameters detected in the operating apparatus due to the competing provided functionalities.

SUMMARY

An object of the invention is accordingly to create an improved operating device by means of which haptic acknowledgment is improved that, for example, is important for blind operation by a user.

The object is solved by an operating device with the features of the independent claims 1. Some embodiments will become apparent from the dependent claims.

In one aspect, an operating device for a vehicle with haptic acknowledgment is provided that comprises a touch-sensitive position detection apparatus for determining touch positions as entry parameters on a touch surface of the touch-sensitive position detection apparatus; an actuator apparatus coupled to the touch-sensitive position detection apparatus for generating the haptically detectable acknowledgment on the touch surface; and an operating logic which is designed to execute a triggering of functions and/or vehicle systems depending on detected entry parameters, wherein the touch-sensitive position detection apparatus and the actuator apparatus are configured with a haptic control apparatus in an operating apparatus, and the operating logic is provided in a central control apparatus which is provided separately from the operating apparatus and is coupled to the operating apparatus, and detected entry parameters are forwarded to the haptic control apparatus, wherein the haptic control apparatus comprises a memory apparatus in which a plurality of different templates are saved, wherein the plurality of templates each comprise at least one trigger condition for a haptic acknowledgment, and the operating logic is configured to transmit a template signal for selecting or generating a current template to the haptic control apparatus, and wherein the haptic control apparatus comprises a comparison apparatus, which compares the detected entry parameters touched during a user entry in the operating apparatus with the at least one trigger condition of the current template in order to determine whether the detected entry parameters satisfy the at least one trigger condition, and the haptic control apparatus is configured to control the actuator apparatus for generating the haptic acknowledgment if the comparison apparatus has identified the fulfillment of the at least one trigger condition.

BRIEF DESCRIPTION OF THE DRAWINGS

The invention is explained in the following using exemplary embodiments.

In the drawings.

Figure 1:
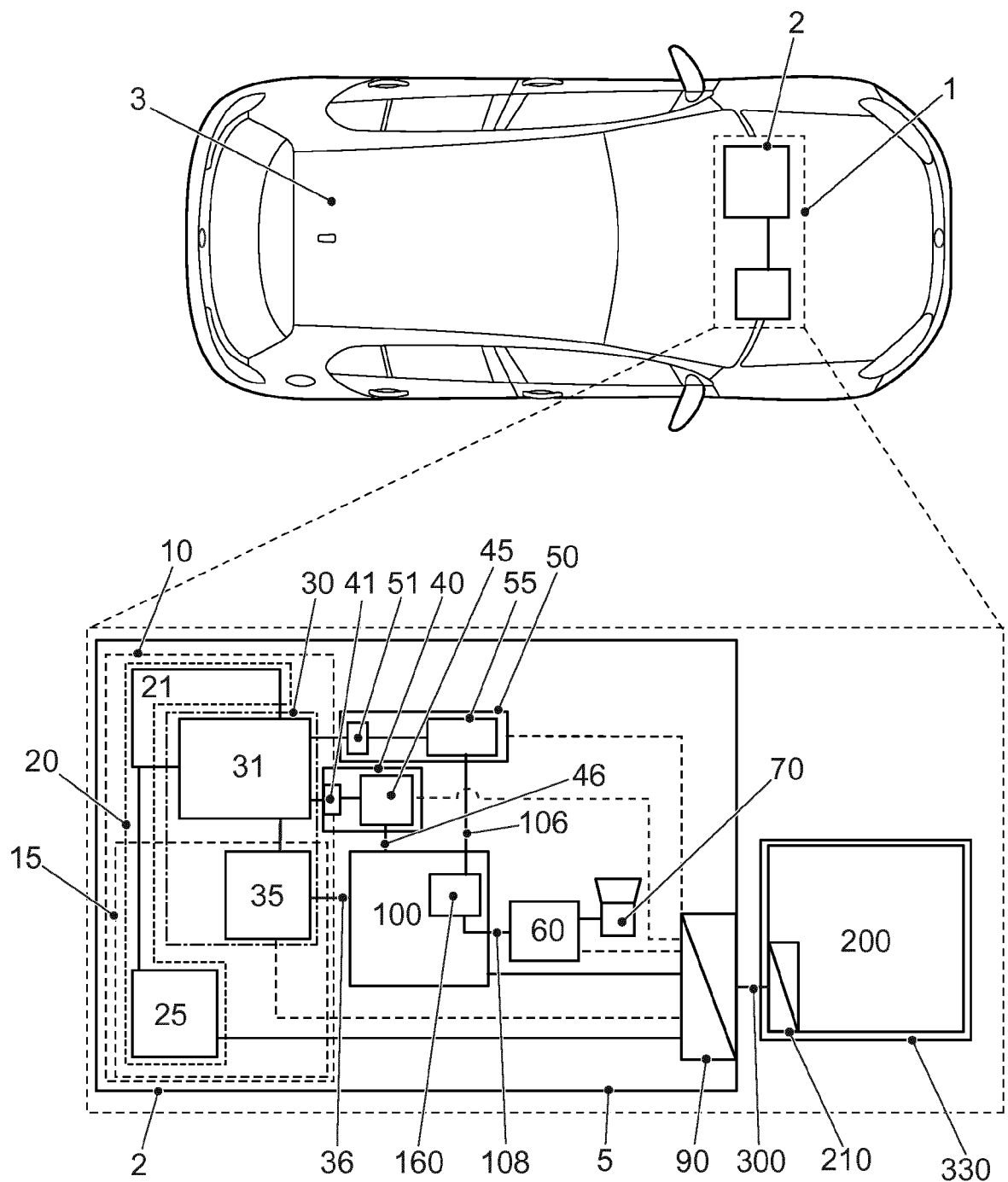
FIG. 1 shows a schematic representation of an operating device and its arrangement in a motor vehicle.

The present disclosure is based on the concept of minimizing a latency period that passes between the execution of touch actuation, i.e., the detection of a parameter entry by user, and the outputting of haptic acknowledgment to the user in order to provide prompt acknowledgment. With large latency periods, the haptic acknowledgment by a user is no longer assigned to the actual actuation event which irritates in particular the inexperienced user. Without having to migrate the operating logic into the operating apparatus, this object can be achieved by designing a haptic control apparatus in the operating apparatus to which the detected entry parameters are additionally forwarded. This haptic control apparatus accordingly evaluates the operating parameters detected in the operating apparatus separately from the central control apparatus to which these entry parameters are also forwarded in order to determine whether there is a user entry for which haptic acknowledgment should be output. Only a few pieces of information are needed for this. The requirements that have to be fulfilled to trigger haptic acknowledgment are combined into a trigger condition. One or more trigger conditions that are valid at a point in time are assigned to a template. The templates are saved in a memory of the haptic control apparatus. A template is selected or generated as being current by the central control unit by means of a template signal so that the haptic control apparatus can react promptly to user entries with haptic acknowledgment without knowing the operating logic when the detected entry parameters reveal that a trigger condition for the current template has been fulfilled. One benefit of the present aspect is that an exchanged amount of data between the operating apparatus and central control apparatus is reduced, and a latency period for haptic acknowledgment is significantly reduced at the same time.

Definitions

An operating device is understood to be a device for detecting a user entry. Devices that are designated a display and operating device are also considered an operating device in this context.

The part of an operating device is designated an operating apparatus which is designed on or in the housing in which is designed the physically-designed user detection apparatus used to detect a user entry.

An operating device with which a user makes an entry by touch-actuating a touch-sensitive position detection apparatus comprises the operating apparatus including all components that are designed in the housing or on the housing, and in or on which a touch surface of the touch-sensitive position detection device is arranged, including the housing.

The part of the operating apparatus is designated the central control apparatus that, depending on the detected entry parameters, causes a function to be triggered and controlled by vehicle functions and control systems that do not directly affect the user entry detection. Thus, an operating logic of the operating device is designed in the central control apparatus, and for example establishes which function is triggered or activated in the presence of which entry parameter.

A freely-programmable display device is understood to be a device with a display surface on which highly different information can be graphically displayed sequentially over time at the same position of the display surface. Since this is controlled by a program-controlled apparatus, mention is made of a freely-programmable display device. A display surface of such a freely-programmable display device is designated a freely-programmable display surface.

A touch-sensitive position detection apparatus is a device that has a touch surface which is generally designed flat and smooth, and which is designed to determine a touch site by an actuating element. Such a determined site is designated a touch position. Touch-sensitive position detection apparatuses that are capable of simultaneously detecting a plurality of touch positions are designated multiple touch-sensitive position detection apparatuses, or multi-touchable devices. These constitute a subgroup of touch-sensitive position detection apparatuses.

If the touch surface is designed transparent and coupled to a freely-programmable display surface therebehind, the overall device is designated a touchscreen. In this case as well, again there is the subdivision of single touch-sensitive touchscreens and multiple touch-sensitive touchscreens that can simultaneously detect a plurality of touch positions by actuating elements.

An object is designated an actuating element that is suitable for actuating the touch-sensitive position detection device. This is generally a body part such as an extended finger or an index finger. Alternatively however, a pin or another object can serve as the actuating element.

The embodiments of an operating element with a freely-programmable display surface in conjunction with a touch-sensitive position detection apparatus are designated a virtual operating element. In this context, the virtual operating element is generally assigned a graphic display on the display surface. Moreover, there is a trigger region defined relative to the touch-sensitive position detection apparatus within which touch positions are understood to be a selection of the corresponding virtual operating element.

A pressure force measuring apparatus is designated any measuring apparatus that is capable of measuring an actuating force acting perpendicular to the touch surface when the touch surface is actuated. This can be all sensor types and sensors or sensor elements that enable such a measurement.

Strain gauges designate strip-shaped sensor elements that change a physically measurable property based on a strain on the strip. In particular, strain gauges are designed as resistive sensor elements that change their resistance under strain.

A control is a device that designates a totality of all components that are provided for evaluating detected signals or user entries, and/or for controlling components of the device and/or their devices. The control components can be implemented in hardware, and/or software, or combinations of hardware and software. Components of the control that are designed in the operating apparatus of the operating device are designated local control apparatuses.

The terms haptic feedback, haptic acknowledgment and haptic response are used as synonymous terms. They describe an effect perceptible by human touch for the purposes of the response to the user by a device.

To the extent that detection or ascertainment of pressure force is addressed here, it means detection or ascertainment designed separately from touch-sensitive position detection.

A trigger condition covers all the requirements for detected entry parameters that must exist to trigger haptic acknowledgment. The requirements are also termed instructions.

Requirements that have conditions for entry parameters detected at different times are termed temporal specification.

A template includes one or more trigger conditions.

EMBODIMENTS

In one aspect, an operating device for a vehicle with haptic acknowledgement is provided that comprises:

A touch-sensitive position detection apparatus for determining touch positions as entry parameters on a touch surface of the touch-sensitive position detection apparatus;

an actuator apparatus coupled to the touch-sensitive position detection apparatus for generating the haptically detectable acknowledgment on the touch surface; and an operating logic which is designed to execute a triggering of functions and/or vehicle systems depending on detected entry parameters, wherein the touch-sensitive position detection apparatus and the actuator apparatus are designed with a haptic control apparatus in an operating apparatus, and the operating logic is designed in a central control apparatus which is designed separately from the operating apparatus and is coupled by information technology to the operating apparatus, and detected entry parameters are forwarded to the haptic control apparatus and in some embodiments also to the central control apparatus, wherein the haptic control apparatus comprises a memory apparatus in which the plurality of different templates are saved, wherein the plurality of templates each comprise at least one trigger condition for a haptic acknowledgment, and the operating logic is designed to transmit a template signal for selecting or generating a current template to the haptic control apparatus, and wherein the haptic control apparatus has a comparison apparatus which compares the detected entry parameters touched during a user entry in the operating apparatus via the operating apparatus with the at least one trigger condition of the current template in order to determine whether the detected entry parameters satisfy the at least one trigger condition, and the haptic control apparatus is designed to control the actuator apparatus for generating the haptic acknowledgment if the comparison apparatus has identified the fulfillment of the at least one trigger condition.

Likewise, a method is provided in another aspect for detecting user entries for controlling and/or triggering functions and/or vehicle systems by touch-actuating a touch surface of a touch-sensitive position detection device, comprising the following steps:

detection of entry parameters upon the touch actuation of the touch surface of a touch-sensitive position detection apparatus, evaluation of the detected entry parameters with reference to an operating logic that instigates a triggering of the functions and/or vehicle systems depending on the detected entry parameters, and generation of haptic acknowledgment at the touch surface when a user entry is detected, wherein the detection of the entry parameters is done by an operating apparatus that is designed separate from a central control apparatus which is coupled by information technology to the operating apparatus, and the evaluation by the operating logic occurs in the central control apparatus, wherein a template signal is transmitted by the central control apparatus to the haptic control apparatus of the operating apparatus by means of which one of several templates of the haptic control apparatus is selected as a current template, or the current template is generated, wherein a template comprises at least one trigger condition for a haptic acknowledgment, and the entry parameters detected on or in the operating apparatus are forwarded to a haptic control apparatus in the operating apparatus and to the central control apparatus, and the detected entry parameters are compared with the at least one trigger condition in the haptic control apparatus in order to determine whether the detected entry parameters satisfy the at least one trigger condition, and the haptic control apparatus controls the actuator apparatus to generate the haptic acknowledgment when the comparison of the entry parameters with the at least one trigger condition indicates that the at least one trigger condition is fulfilled.

To achieve a prompt haptic acknowledgment to the actuation, the triggering of the haptic acknowledgment may be instigated by a haptic control apparatus integrated in the operating apparatus. In some embodiments, this evaluates for example only the detected pressure forces. Once the first force threshold is reached or exceeded, the first haptic acknowledgment and possibly the first acoustic feedback is output in the form of a sound signal that is output synchronized in time. The next time the second force threshold is undershot, the second haptic and possibly second acoustic feedback are output.

However, to prevent the haptic feedback from being generated when the user presses the touch surface with the actuating element at a location that does not lie in the trigger region of a virtual operating element, a local haptic control in some embodiments may be designed so that it transmits the positions or regions of the touch surface where a trigger region of a virtual operating element is located that is displayed on the display surface. In a local haptic control apparatus, a monitoring of the force thresholds is carried out along with a check of the currently ascertained touch positions with the touch positions of the activation regions. If the touch position lies in any of the activation regions and the first force threshold is also exceeded, the first actuator activation signal, and possibly also the first sound activation signal, are generated. After the second force threshold is subsequently undershot, the second actuator activation signal and possibly a second sound activation signal are generated. The benefit of these embodiments is that haptic feedback is always generated promptly by an actuation of an operating element without being influenced by transmission times to the central computer and its processing speed. In addition, the touch positions and force values are forwarded by a bus system to the central computer which then causes the actual triggering of the function, and possibly graphic transformation of the information depicted on the display surface.

Normally and in some embodiments, haptic acknowledgment is accordingly only generated when the touch actuation occurs at certain positions of the touch surface, or in certain areas. Some embodiments of the operating system therefore provide that the at least one trigger condition comprises at least one area definition for a trigger region, and the comparison apparatus is designed to only determine the fulfillment of the at least one trigger condition when, in comparing the detected entry parameter with the at least one trigger condition, it is determined that the touch position detected as an entry parameter lies within the trigger region of the trigger condition.

According to the present embodiments, the method provides that a touch position is detected as an entry parameter, and the at least one trigger condition comprises at least one area definition for a trigger region, and the fulfillment of the at least one trigger condition is only identified when, in the comparison of the detected entry parameter with the at least one trigger condition, it is determined that the touch position detected as the entry parameter lies within the trigger region of the trigger condition.

With operating devices that are equipped with a touchscreen or a detached touchpad, another difficulty in operation, in particular in a motor vehicle, is that vibrations on an uneven road, etc. can cause a user to unintentionally touch the touch-sensitive position detection apparatus with an actuating element, for example his finger, or to touch an undesired position before an actuating process. To prevent incorrect triggering, some embodiments provide also determining a pressure force, generally at the touch position, by which the actuating element presses against the touch-sensitive position detection apparatus. In general, the following must also be fulfilled: that a touch position is detected at a given location or in a given region assigned to a virtual operating element, and a pressure force must also exceed a given threshold. In this case, there is a triggering of the function and, if an actuator is directly or indirectly coupled to the touch-sensitive position detection apparatus, there is also a triggering of a haptic acknowledgment. Some embodiments of the method accordingly provide that a pressure force exerted from the touch actuation of the touch surface is detected by means of a pressure force measuring apparatus coupled to a touch surface in the operating apparatus as one of the entry parameters, and the at least one trigger condition comprises at least one pressure force instruction, and the fulfillment of the at least one trigger condition is only identified when the pressure force detected as the entry parameter fulfills the pressure force instruction. The operating device in some embodiments may have a pressure force measuring apparatus coupled to the touch surface in the operating apparatus and detects a pressure force exerted from the touch actuation of the touch surface as one of the entry parameters, and the at least one trigger condition comprises at least one pressure force instruction, and the comparison device is designed to only identify the fulfillment of the at least one trigger condition when it is determined that the pressure force detected as the entry parameter fulfills the pressure force instruction in a comparison of detected entry parameters with one of the trigger conditions.

It is beneficial in some embodiments to also evaluate the touch force or pressure force exerted by an actuating element perpendicular to the touch surface in addition to the touch position to make it easier for the user to use in particular a virtual operating element in some embodiments in which the touch surface is transparent and arranged in front of a freely-programmable display surface of a display device for which a graphic representation is depicted on the display surface. Some embodiments provide comparing the detected pressure force with a first force threshold and, when the first force threshold is reached or exceeded from the detected actuation force or pressure force, to return a first haptic acknowledgment to the user, i.e., initial haptic acknowledgment, by the touch surface. This first haptic acknowledgment communicates to the user that he has pressed the virtual operating element with sufficient actuation force so that a function can be triggered. Moreover in some embodiments, the actuation force or pressure force is compared with a second force threshold that is less than the first force threshold. If after the first force threshold has been exceeded by the determined pressure force and it is undershot by the determined pressure force or actuation force, a second acknowledgment may be different from the first haptic acknowledgment is output to the user via the touch surface of the touch-sensitive position detection apparatus. This acknowledgment approach experienced by the user largely corresponds to the haptic perception experienced by user in actuating a physically designed button. The first haptic feedback corresponds for example with pressing an operating element against a stop, and the second haptic feedback corresponds with the haptic acknowledgment that for example occurs when an elastic element springs back upon releasing a mechanical button. The benefit is that the device, or respectively the method, can communicate a haptic acknowledgment that very closely approximates that of a mechanical operating element so that blind operation by the user is easy and reliable, in particular without looking. To enable such embodiments of the operating system, at least one of the plurality of templates comprises at least one additional trigger condition different from the at least one trigger condition, in addition to the at least one trigger condition, wherein the different trigger conditions are linked to different haptic acknowledgments, wherein the different haptic acknowledgments cause different haptic impressions in the user at the touch surface. The method is developed so that one of the plurality of templates comprises at least one additional trigger condition different from the at least one trigger condition in addition to the at least one trigger condition, wherein the different trigger conditions are linked to different haptic acknowledgments, and the different haptic acknowledgments cause different haptic impressions in a user in the touch surface, and the detected entry parameters are compared with the different trigger conditions, and different haptic acknowledgments are accordingly generated in the touch surface depending on which of the trigger conditions is fulfilled.

In some embodiments, also an acoustic acknowledgment in addition to the haptic acknowledgment is provided. For this, some embodiments have a speaker arranged on or in the housing, and the control has a sound generating apparatus that emits an acoustic sound through the speaker synchronized in time at least with one of the actuator activation signals. Some embodiments accordingly provide outputting an acoustic signal with the haptic acknowledgment in the operating apparatus.

If a plurality of haptic acknowledgments are generated in an operating process, an acoustic sound is output by the speaker both with the first haptic acknowledgment as well as with the second haptic acknowledgment. Some embodiments accordingly provide emitting a sound signal synchronized in time both with the first haptic acknowledgment as well as with the second haptic acknowledgment. The two emitted sounds are designed different for the two haptic acknowledgments.

Since a human user is capable of spatially locating sound sources, it is necessary to emit the sound in the proximity of the touch surface at which the mechanical actuation occurred to optimally imitate a mechanical button with a touch-sensitive position detection apparatus that is coupled to a display surface. The speaker is therefore in some embodiments arranged in or on the housing in which the touch surface of the touch-sensitive position detection apparatus is mounted.

To ensure that the detection of the haptic acknowledgment on the touch surface and the detection of the acoustic sound are synchronized in time, the operating device in some embodiments may have a delay device that delays an electronic sound activation signal relative to the actuator actual activation signal so that the time required for the mechanical deflection of the touch surface is compensated by the relative delay of the electronic sound activation signal in relation to the actuator activation signals so that a maximum deflection of the pulse-like mechanical deflection is output at the same time as a beginning of an acoustic sound, in some embodiments a sound pulse. The sound activation signal causes the acoustic sound or sound signal to be output by the sound generator.

The synchronization in time improves the assignment of sound to the haptic acknowledgment.

In some embodiments, the actuator apparatus is designed to deflect the touch surface perpendicular to its two-dimensional extent in pulses. A benefit of such embodiments is that the haptic acknowledgment can act opposite the direction of actuation. The acknowledgment can, for example, thus act similar to a resetting force of a mechanical operating element.

In some embodiments, the touch surface is designed rigid. This means that minimal sag or local deformation occurs upon actuation. In particular with actuators that cause a movement perpendicular to the two-dimensional extension of the touch surface, such embodiments also make the actuator have to be able to exert greater force on the touch surface than is the case with embodiments in which actuators deflect the touch surface in the plane of the two-dimensional extension, and hence perpendicular to the direction of actuation.

With these embodiments with acknowledgment deflection in the plane of the touch surface, a "fixed" mounting in the direction of operation is easier. A triggering of the actuator moreover scarcely influences the measurement of pressure force since when pressure force is measured, only the force perpendicular to the direction of movement of the acknowledgment, i.e., perpendicular to the touch surface, is measured. A possible disadvantage of such embodiments is, however, that a lateral movement causes a distortion of the visual perception of the information displayed on the display surface, assuming that the touch surface is firmly coupled to the display surface arranged behind it and is accordingly also deflected in the haptic acknowledgment.

This information is then perceived as moving or unfocused which may be disadvantageous. Consequently, the deflection amplitude should be selected to minimize these effects.

The touch surface, possibly with the display surface of the display device, is mounted on leaf springs to the housing. To prevent dust and dirt from entering the device, a frame of the housing in some embodiments may overlap with an edge region of the touch surface, or respectively the display device coupled to the touch surface.

Strain gauges have proven to be particularly suitable force measuring sensors that change their resistance depending on their strain. The resistance of a measuring strip is determined with an electronic measuring circuit, and an electronic signal representing the pressure force is generated. In some embodiments, the signal level is proportional to the determined pressure force. Some embodiments that use a strain gauge, a plurality of strain gauges are arranged on the plurality of bearing points of the touch surface with the housing, and are evaluated together or individually.

In other embodiments, a plunger for example is coupled to the touch surface that experiences a deflection in the direction of actuation upon touch actuation. A capacitor electrode is deflected by the plunger so that the capacitance of a capacitor changes depending on the pressure force transmitted by the plunger. A force signal is again generated by an electronic circuit. Embodiments are also conceivable in this context that evaluate a plurality of such force measuring sensors.

Other embodiments in turn measure the pressure force inductively. With an inductive force measuring sensor, a pot magnet for example is rigidly coupled to the touch surface and extends into a coil. When the touch surface is actuated, the pot magnet moves along the coil axis and accordingly causes an induction in the coil. By the induced current, it is possible to determine the movement of the force triggering the pot magnet. The benefit of such embodiments is that the same arrangement which is used to measure force can also be used as an actuator by intentionally energizing the coil.

Some embodiments have a plurality of such inductive actuator sensor apparatuses which for example are arranged in the four corners of a rectangularly designed touch surface on the rear side of the touch surface, or respectively the rear side of the display device arranged behind it.

Other embodiments can provide piezosensors for determining the force.

Actuator devices with actuators that can cause a deflection parallel to the touch surface are in some embodiments designed as electromechanical actuators. The actuator activation signals, or control signals derived therefrom for the actuator(s), or the actuators and the mount of the touch surface, may be designed so that the acknowledgment pulses which are used for various haptic acknowledgments ideally only trigger a single deflection and return to home position with possibly a very strongly dampened overshoot. Different haptic acknowledgments can accordingly be designed differently in terms of a strength of the deflection as well as a duration of the deflection.

Generally, a plurality of functions is offered simultaneously for operation by such an operating device so that the display device is designed to depict a plurality of virtual operating elements. Each virtual operating element is then assigned a trigger region. The operating logic of the central control apparatus can use the detected touch position to determine which virtual operating element the user wishes to actuate with the actuating element, and the function assigned to the corresponding virtual operating element is selected.

For the haptic control apparatus, the distinction is not absolutely essential if for example, the associated force threshold, or the associated force thresholds are the same for all virtual operating elements.

In some embodiments of the operating device, the function is triggered by the central control apparatus already when the first force threshold is exceeded.

However, embodiments of the operating device are beneficial in which the function is only triggered by the central control apparatus when the second force threshold is undershot.

To create a trigger condition for a haptic acknowledgment when the second force threshold is undershot, it may be necessary to evaluate the pressure force at different points in time. Since the second force threshold which is a release force threshold which can be associated with the enabling, or respectively release of a button or a virtual operating element, is less than the first force threshold which is linked to the selection of the function which is assigned to the corresponding trigger region or the virtual operating element whose area was touched, a function should only be triggered when the second force threshold is undershot after the first force threshold has been previously exceeded. Some embodiments accordingly provide that the at least one trigger condition and/or the at least one additional trigger condition, comprise a temporal specification, for example a temporal pressure force instruction, that comprises instructions for entry parameters detected at different times, for example for the pressure forces detected as entry parameters at different times, and the comparison apparatus is designed to compare entry parameters detected at different times, for example pressure forces detected as entry parameters, with the specifications of the temporal specification, for example of the temporal pressure force specification, and to identify the fulfillment of the at least one trigger condition, and/or the least one additional trigger condition, in comparing the detected entry parameters with one of the trigger conditions, only when the entry parameters detected at different times such as the pressure forces detected as entry parameters at different times, fulfill the instructions of the temporal specification, for example the temporal pressure force instruction at the different times.

Some embodiments of the method provide that the at least one trigger condition and/or the at least one additional trigger condition, comprise a temporal specification that comprises instructions for the entry parameters detected at different times, and the entry parameters detected at different times are compared with the specifications of the temporal specification, and the fulfillment of the at least one trigger condition, and/or the least one additional trigger condition, is identified in comparing the detected entry parameters with one of the trigger conditions, only when the entry parameters detected at different times fulfill the instructions of the temporal specification at the different times.

Such embodiments are capable of also implementing user interfaces in which the touch positions detected together over time are also combined into touch tracks, and these touch tracks or sections thereof are classified with respect to given touch gestures. If a touch track is classified as a touch gesture, a function linked to the touch gesture can then be triggered. In particular, functions such as maximizing and minimizing the graphic display (zooming), scrolling through lists, etc. can be realized. The individual list entries in contrast can be virtual operating elements whose actuation triggers the above-described haptic feedback. The temporal specification can accordingly be a temporal position instruction that establishes that touch positions detected together over time which form a straight line of a minimum length and were detected within a given time period constitute such a touch gesture for which a haptic acknowledgment is generated. Without having to analyze a gesture per se, the haptic control apparatus can determine with fewer instructions whether or not a haptic acknowledgment should occur.

If a plurality of different functions can be used and triggered with the operating device, complicated logic may be needed to implement the underlying operating logic of a human-machine interface (HMI). This may be implemented in a central computer controlled by a program in interaction with a central processing apparatus. These are designed in the central control apparatus. The display device and the touch-sensitive position detection apparatus each have their own control apparatus which is arranged in proximity to the touch surface, or respectively the display surface. The haptic control unit is also such a local control apparatus of the operating apparatus. The overall control and operating device is accordingly distributed between these local control apparatuses of the operating apparatus and a central computer of the central control apparatus coupled thereto by a BUS system.

Some embodiments of the operating device accordingly provides that the operating device and the central control apparatus are linked by IT by a serial data bus to forward the detected entry parameters and transmit the template signal.

Alternatively or in addition to generating a haptic acknowledgment when a force threshold is exceeded and/or undershot, an additional haptic feedback can be output in some embodiments when a virtual operating element is accessed and/or left, in particular when stroking the touch surface. This makes it easier to find the actuatable operating elements without looking. In this context, the haptic acknowledgments for accessing and leaving a virtual operating element can differ.

A user can accordingly haptically differentiate both processes. The acknowledgments differ from those that are generated from actuating the virtual operating element. "Accessing a virtual operating element" is understood to be the initial detection of a touch position in a trigger region of the operating element since previously detected touch positions do not lie within this trigger region, to the extent that said touch positions were detected in a preceding set time interval. Conversely, leaving is identified when the touch position is no longer detected in trigger region of the virtual operating element in which touch positions of the actuating element were previously detected. In some embodiments, an initial touching of the touch surface in a trigger region is interpreted as accessing, and an ending of touching which previously occurred in a trigger region is interpreted as leaving. Other embodiments do not include these two instances.

A very small data exchange volume arises between the central control apparatus and the haptic control apparatus in embodiments in which the various templates are saved in a memory apparatus of the haptic control apparatus, and the current template is selected by forwarding an ID to the operating apparatus which identifies one of the templates. The communication of an ID is sufficient in such instances.

With regard to adapting the templates to the current operating context, greater flexibility is achievable with embodiments in which at least one template is parameterized, and condition parameters are transmitted in addition to the ID identifying the template. Such templates identify for example parameterizable virtual operating elements, i.e., parameterizable trigger regions that for example are parameterized by an indicated position on the touch surface and a size. Alternatively with rectangular trigger regions, coordinates of diagonally opposing corner points can be used for parameterization. In addition, such a trigger region can be assigned a force threshold that must be exceeded to select or trigger a function. Moreover, the type of haptic acknowledgment, i.e., its strength, duration, signal form, etc. is established. Possible signal forms are a single pulse, double pulse, vibration, etc. Generally, a plurality of different types of haptic acknowledgments are saved already predefined in the haptic control apparatus so that only one type of haptic acknowledgment is selected in parameterization. Additional parameters can parameterize an acoustic output, i.e., a sound signal.

In this case as well, sound samples, short sound recordings, may be saved in the haptic control apparatus, or an acoustic control apparatus, or a sound generator. Frequently, there is fixed assignment between the different types of haptic acknowledgment and sound signals, i.e., sound recordings, etc. One or more trigger conditions can be parameterized for a template using such parameters. In this context, the trigger regions of a plurality of virtual operating elements for which the same haptic and possibly also the same acoustic acknowledgment is generated when they are actuated depending on the same force threshold can be combined into a common trigger region and considered in a trigger condition.

The same trigger region can be linked to a temporal specification in order to generate a haptic acknowledgment which is output when the virtual operating element is released. The temporal specification stipulates for example that a first selection force threshold is initially reached or exceeded, and then a release force threshold is undershot, wherein the release force threshold is lower than the selection force threshold.

One and the same trigger region can accordingly be the basis for a plurality of trigger conditions. Additional trigger conditions can be linked to haptic acknowledgments upon accessing the trigger region (initial touching of the touch surface in the trigger region, or sliding into the trigger region), leaving the trigger region (lifting off or sliding out the actuating element), exceeding a second selection force threshold, etc. The haptic acknowledgments may be different for the different events in order to improve and facilitate blind operation.

In some embodiments, the template signal can be generated so that at least one trigger condition for the current instruction can be modified or generated in the haptic control apparatus using forwarded operating parameters so that the at least one trigger condition is adapted to the current operating context.

The present disclosure offers the benefit that the controlling of the actuator apparatus to actuate a haptic acknowledgment occurs locally in the operating apparatus independent of the evaluation of the operating logic in the central control apparatus. Accordingly, a short latency period is achieved between the triggering actuation event and haptic acknowledgment.

In the following, embodiments of the invention will be explained in greater detail with reference to the drawings.

A motor vehicle 3 with an operating device 1 is schematically represented in FIG. 1.

The operating device 1 comprises an operating apparatus 2 with a housing 5 that is generally arranged in the region of the dashboard, although particularly in a middle console. A touchscreen 10 is arranged in the housing and comprises a freely-programmable display device 20 and a touch-sensitive position detection apparatus 30 linked thereto. In most embodiments, a display surface 21 of the freely-programmable display device 20 is securely connected to a touch surface 31 of the touch-sensitive position detection apparatus 30. In any case, at least in the touch surface 31 of the touch-sensitive position detection apparatus 30 is movably mounted relative to the housing 5, in some embodiments, elastically.

A display control apparatus 25 controls the representation of information on the display surface 21. A position detection control apparatus 35 is designed so that these coordinates are determined of the detected touch positions of a touch actuation of the touch surface 31 by an actuating element (not shown). These coordinates, or respectively the touch position, represent entry parameters. The touch surface 31 is transparent and can be integrated in the display surface 21. Accordingly, the information depicted on the display surface 21 such as graphic characters, pictograms, graphic representations of operating elements, etc., are visible through the touch surface 31.

A pressure force measuring apparatus 40 is coupled to the touch surface 31 or, if the touch surface is connected to the freely-programmable display device 20, to the touchscreen 10, and upon a touch actuation perpendicular to the touch surface 31, is able to measure an actuating force acting thereupon. For example, one or more sensor elements 41 can be connected to the touch surface 31 that generate a signal when the touch surface 31 is deflected which is converted by a pressure measuring control apparatus 45 into a pressure force signal 46 that indicates the determined pressure force or actuation force. The determined pressure force also represents an entry parameter. Moreover, at least one actuator apparatus 50 is coupled to the touch surface 31 or to the touchscreen 10 if the touch surface 31 is securely connected to the display surface 21, and comprises an actuator 51 that is controlled by an actuator control apparatus 55.

The operating device 1 moreover comprises a haptic control apparatus 100 arranged in the housing 5 that is connected at least to the pressure measuring control apparatus 45, i.e., to the pressure force measuring apparatus 40, and the actuator control apparatus, i.e., to the actuator apparatus 50. The haptic control apparatus 100 is designed to generate actuator activation signals 106 using the detected entry parameters, e.g., the detected pressure forces and/or the detected touch positions, that are then converted by the actuator control 55 so that the actuator 51 deflects the touch surface 31 of the touch-sensitive position detection apparatus 30 to produce a haptically perceptible effect. This is termed a haptic acknowledgment.

Generally, the haptic control apparatus checks whether the detected entry parameters fulfill the instructions contained in one or more trigger conditions. If a trigger condition is fulfilled, the corresponding assigned haptic acknowledgment is triggered.

In a simples embodiment, the haptic control apparatus 100 checks the detected pressure force or actuation force with a first force threshold, or respectively a first force threshold value. If this force threshold, or respectively the first force threshold value, is reached or exceeded, a first actuator activation signal 106 is generated that causes a first haptic acknowledgment by the actuator control apparatus 55 and the actuator 51 in the touch surface 31. If a second force threshold, or respectively a second force threshold value that is less than the first force threshold value is undershot after the first force threshold, or respectively the first force threshold value is reached or exceeded by the detected pressure force or actuation force, a second actuator activation signal 106 is generated that causes a second haptically detectable effect in the touch surface 51 by the actuator control apparatus 55 and the actuator 51. The two detectable haptic effects may be different, so that a user can distinguish them. The haptic effects may be designed as short, ideally single deflections of the touch surface. These differ in terms of the deflection amplitude, wherein the deflection amplitude may be larger in the haptic effect that is generated by the first actuator activation signal than in the haptic effect that is triggered by the second actuator activation signal.

In some embodiments, the trigger condition linked to the first haptic acknowledgment checks whether the pressure force detected as an entry parameter reaches or exceeds the first force threshold upon actuating the touch surface.

If this is the case, the first trigger condition is fulfilled, and the first haptic acknowledgment is triggered.

The trigger condition linked to the second haptic acknowledgment comprises a temporal specification. The temporal specification contains instructions for one or more entry parameters at different points in time. In the provided example, the first instruction over time is that the pressure force reaches or exceeds the first force threshold. The second instruction following in time dictates that the second force threshold, which is less than the first force threshold, is undershot. A haptic acknowledgment linked to "enabling"/"releasing" the actuated touch surface should only occur when the first force threshold has been previously exceeded and the first haptic acknowledgment has been output.

The trigger conditions assigned to a time or operating context of the operating device are all combined into a template. The currently valid trigger conditions are correspondingly combined into a current template.

To improve the sensory perception on the part of the user, in particular for the touchscreen 10 to better imitate button operating elements, a sound activation signal 108 may be sent to a sound generator 60 by the haptic control 100 that outputs a sound signal or sound via speakers 70 arranged on or in the housing synchronized with the deflection of the touch surface 31 caused by the actuator 51. In this context, a delay apparatus 160 may be provided in the haptic control apparatus 100 that delays the corresponding actuator activation signal 106 and the sound activation signal 108 relative to each other so that the touch surface 31 undergoes maximum deflection when the sound signal is output. Outputting the sound signal synchronized in time with the haptic acknowledgments more effectively imitates a sensory perception of operating a button with which the user is familiar. Arranging the speaker 70 on or in the housing 5 ensures that the user correlates the emitted acoustic sound signal with a haptic effect due to his spatial hearing since the effect is perceived as coming from the site of touch. The acknowledgment effect is reinforced. It was revealed that the acknowledgment which is reinforced by an acoustic sound signal emitted locally next to the touch surface is experienced as a pronounced acknowledgment.

It was also shown that haptic acknowledgment with reduced mechanical deflection supplemented with an emitted sound signal which is locally synchronized is perceived just as intensely as an acknowledgment with enhanced mechanical deflection without support by sound. A weaker actuator can accordingly be used when synchronized, locally-emitted sound support is used. This moreover minimizes wear given the reduced deflection of the touch surface with an acknowledgment effect that is perceived by the user just as intensely.

Such embodiments have the disadvantage that haptic acknowledgment is emitted upon touch actuation at every position independent of whether this position on the display surface is assigned to a trigger region of the virtual operating element by a man/machine user interface.

In some embodiments, the haptic control apparatus 100 is therefore also coupled to the position detection control apparatus 35 such that the haptic control apparatus 100 additionally checks whether the touch position detected as an entry parameter lies within a trigger region of the virtual operating element. If this is the case, the actuator activation signals 106 are output and possibly the sound activations signals 108, when the first force threshold, or respectively the first force threshold value is exceeded, and when the second force threshold, or respectively second force threshold value is undershot. In addition, the haptic control apparatus 100 can be designed so that, by using the detected touch position, it determines whether the detected touch position lies within a trigger region of a trigger condition, and furthermore determines whether the first force threshold is reached or exceeded by the detected pressure force. If this is the case, the haptic and possibly also the acoustic acknowledgment assigned to the corresponding trigger region are triggered. It is possible for the haptic control apparatus 100 to output a signal via an interface 90 to the central control apparatus 330 that indicates the triggering of the haptic acknowledgment for information purposes.

The operating logic, i.e., the man/machine interface logic, is not implemented in the haptic control apparatus 100 of the operating apparatus, but rather in a central computer 200 of a central control apparatus 330, wherein the central computer 200 is connected via a central computer interface 210 and a bus 300 to the interface 90 of the operating apparatus 2.

The central computer 200 forwards a template signal in order to select a template as a current template from the plurality saved in the memory 133 of the haptic control apparatus. With a minimum exchange of data, for example an ID identified with the templates, the necessary information is thereby provided to the haptic control apparatus via the activation regions of the individual virtual operating elements for which e.g. two different haptic acknowledgment effects are to be output upon touch actuation with sufficient pressure force as mentioned above. Accordingly, independent from information transmission time, in particular for the detected entry parameters to the central computer and its processing time, as well as the information acknowledgment time, the haptic control is able to promptly generate the haptic acknowledgments, providing that the detected entry parameters fulfill one of the trigger conditions of the current template, such as the detected touch position within one of the trigger regions is recognized, while the first force threshold is exceeded, or respectively the second force threshold is undershot after the first force threshold has been exceeded beforehand.

In addition to being evaluated for the haptic control, the detected entry parameters such as the determined pressure force values as well as the detected touch positions are forwarded by the operating apparatus 2 to the central computer 200. The central computer 200 then evaluates the entry parameters to see if and which vehicle functions are to be triggered, or which vehicle system is to be controlled or operated. It is noted in this context that the operating logic implemented as software in the central computer can cause functions to be triggered that are not linked to a haptic acknowledgment. An actuating element stroked across the touch surface can for example be linked to a vehicle function that is triggered or operated by this type of actuation without a haptic acknowledgment. The evaluation of the entry parameters is in general partly the same or similar in the central computer 200, but can however also differ from that of the haptic control apparatus 100.

The haptic acknowledgment is generally instigated in that an activation signal is transmitted by the haptic control apparatus 100 to the actuator control apparatus 55. Analogously, a sound activation signal can also be forwarded by the haptic control apparatus 100 to the sound generator 60. In some embodiments, only activation information is forwarded, and the specific control signals are generated in the actuator control apparatus 55, or respectively, the sound signals output to the speaker 70 are generated in the sound generator 60.

Figure 2:
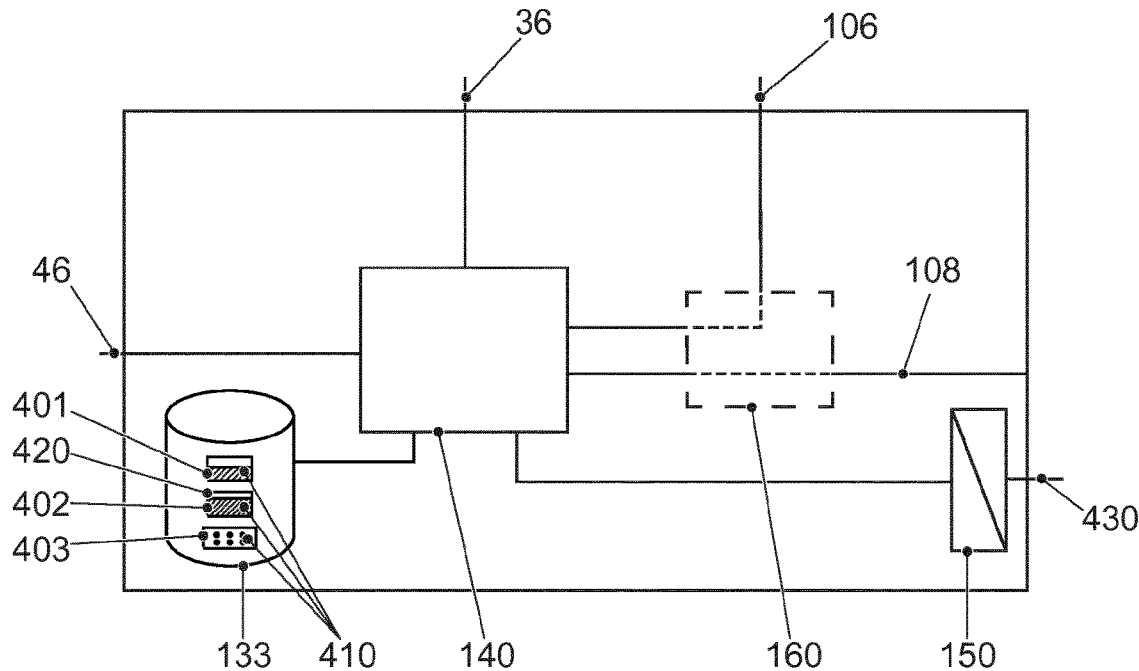
FIG. 2 shows a schematic representation of a haptic control.

FIG. 2 schematically portrays an embodiment of a haptic control apparatus 100. The haptic control apparatus 100 comprises a memory 133. Templates 401-403 are saved therein which each comprise one or more trigger conditions. A trigger condition contains the instructions that the detected entry parameters must fulfill to trigger a haptic acknowledgment, i.e., an actuator activation signal 106 and possibly also a sound activation signal 108 are generated. For example, a trigger condition comprises an area definition for a trigger region on the touch surface in which the touch actuation must occur to trigger a haptic acknowledgment. In addition, a force threshold may also be indicated that must be overcome by the pressure force of a touch contact in the trigger region to trigger the haptic acknowledgment. Moreover, details are assigned to the trigger condition that define the haptic acknowledgment, for example as a short pulse with a given length and intensity or deflection amplitude, as well as possibly details for a sound signal that is to be emitted simultaneously or appropriately delayed. Schematically, only the trigger regions 410 are indicated in the templates to symbolize the trigger conditions. It is noted that a trigger region can be a component of various trigger conditions of a template.

The detected entry parameters that are provided as signals, such as a position signal 36 and a pressure force signal 46, are evaluated in a comparison apparatus 140 to see if they cause one of the trigger conditions of a current template 420 to be fulfilled. The comparison apparatus 140 accordingly checks whether all the instructions for the entry parameters of one of the trigger conditions of the current template 420 are fulfilled. If one of the trigger conditions is fulfilled, an actuator activation signal 106 and correspondingly possibly also a sound activation signal 108 is/are generated that may be delayed by a delay apparatus 160 designed in some embodiments to synchronize the haptic perception with the acoustic perception by a user. The individually detected entry parameters, signals, i.e., a position signal 36, a pressure force signal 46 as well as the actuator activation signals 106 and possibly the sound activation signals 108 are also output by an interface 150. The signals representing the entry parameters can also be directly forwarded by the detection apparatuses to the central control apparatus, or respectively its central computer.

By means of the interface 150, the haptic control apparatus 100 also receives the template signal 430 that causes the current template 420 to be selected. In the simplest form, the template signal 430 only comprises an ID that identifies the saved templates. Likewise, it is possible for the individual templates to be parameterizable. Then the template signal 430 is also given the required parameters for parameterization. With no claim to completeness, these parameters can comprise a specification of a number of trigger regions, their positions, extents, force thresholds linked thereto, force threshold dependencies for temporal specification, haptic parameters such as a pulse form of deflection, a maximum amplitude, pulse duration, etc., sound information such as a sound amplitude selection specification, volume, a specification for delaying haptic triggering, etc. Finally, it is also possible to create new templates and forward the information required therefore on the trigger regions, etc. with the template signal, and then save the template signal in the memory 133.

Figure 3:
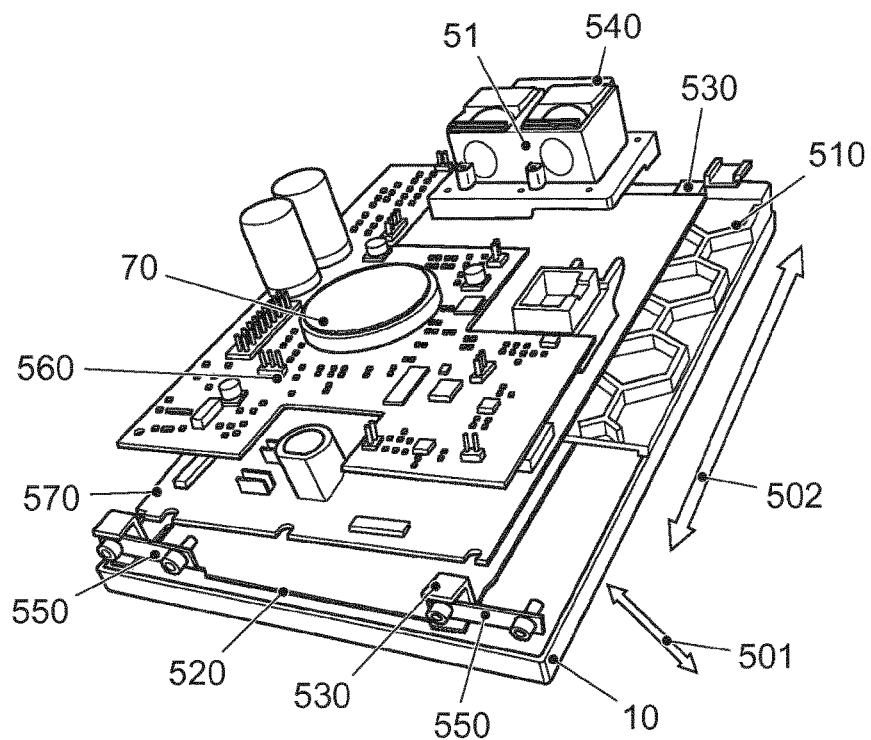
FIG. 3 shows a schematic excluded review of individual components of an operating apparatus.

FIG. 3 schematically portrays a rear view of a plurality of components of an operating apparatus 2. A touchscreen 10 can be seen whose display and touch surface face away from the viewer. The actuation and deflection direction for pressing actuation is indicated by an arrow 501. The touchscreen 10 is arranged on a holder plate 510 that has a honeycomb pattern for stability. This holder plate 510 is designed as rigid as possible. The holder plate 510 is only partially depicted. A touchscreen carrier 520 is arranged between the holder plate 510 and the touchscreen 10 and has holding elements 530 at four corners. The holding elements 530 and/or the touchscreen carrier 520 are designed so that the touchscreen can be elastically deflected in the direction of actuation. Moreover, leaf springs 550 are attached to the holding elements 530 and enable movable mounting on a housing (not shown) so that a deflection in the plane of the touchscreen 10 is possible by an actuator 51 as indicated by an actuator deflection arrow 502. FIG. 3 moreover schematically portrays printed circuit boards 560, 570 in which the various local control apparatuses such as the display control apparatus, the pressure force measuring apparatus, the haptic control apparatus, the actuator control apparatus and a sound generator are designed. In addition, a speaker 70 and actuator 51 can be seen that is fastened on the one hand to a housing (not shown) and to an L profile 540 of the touchscreen carrier 520 on the other hand.

Figure 4:
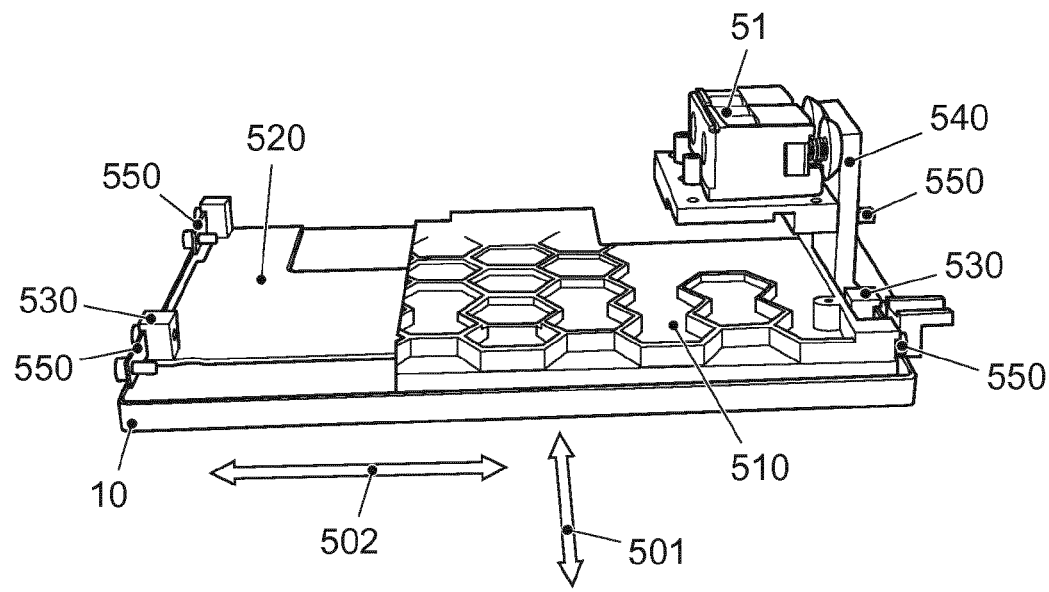
FIG. 4 shows a schematic view of a touchscreen with parts of the holding device.

FIG. 4 shows another schematic view similar to the one shown in FIG. 3 in which the printed circuit boards 560 and 570 are missing. The L profile 540 is readily discernible.

Figure 5:
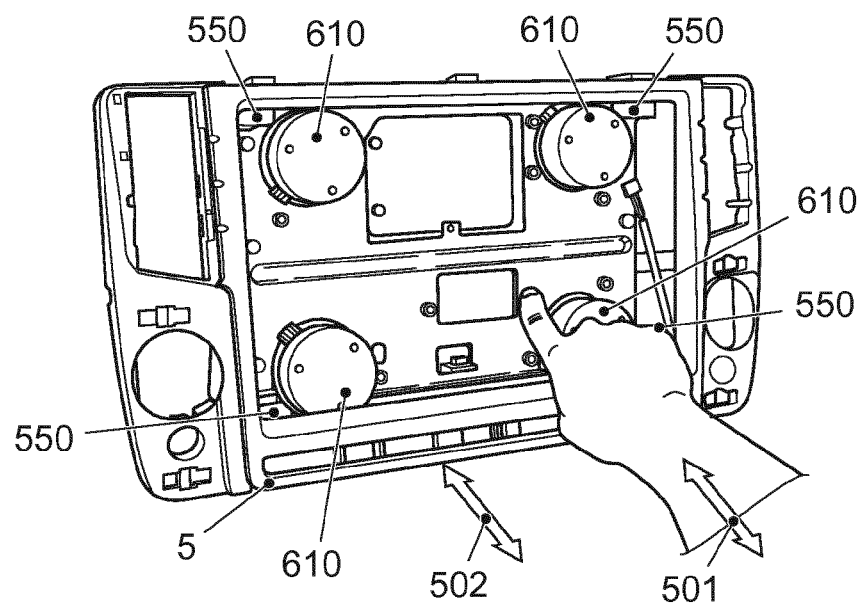
FIG. 5 shows a schematic view of an embodiment of a device in which an actuator acts in the actuating direction, wherein the touchscreen is not included for reasons of clarity.
Figure 6:
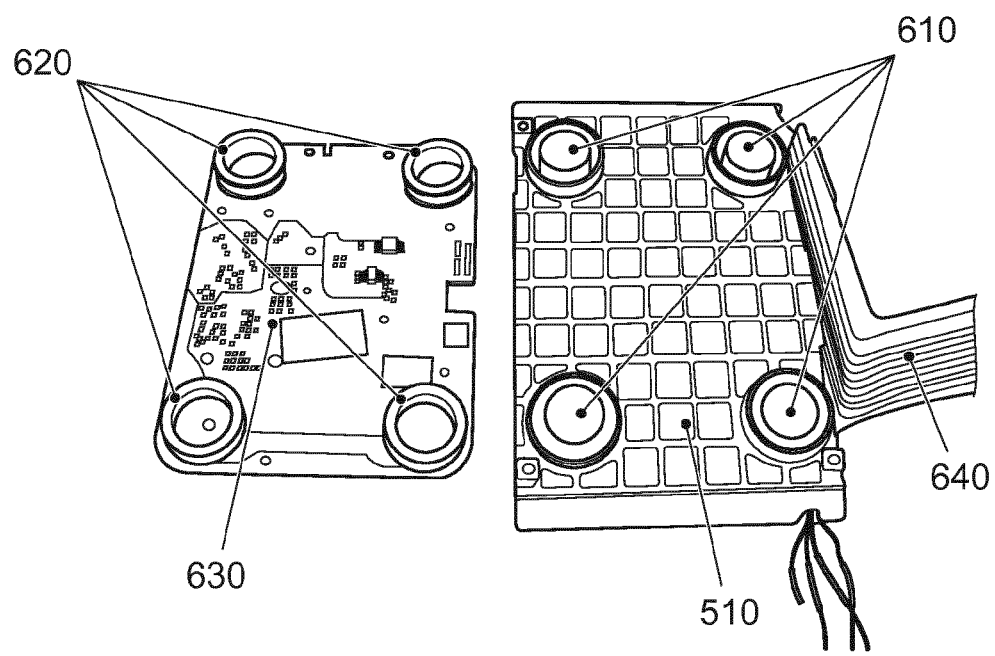
FIG. 6 shows a schematic representation of control electronics and a holder plate.

FIGS. 5 and 6 show an alternative embodiment of an operating apparatus. In FIG. 5, a front view of the housing 5 is discernible in which the touchscreen, the local control apparatuses and the actuators are arranged. For reasons of clarity, the touchscreen as well as the holding plate and a touchscreen carrier are not shown in FIG. 5 and are missing. Moreover, a cover frame for the housing 5 that generally covers an edge of the touchscreen to prevent dust and other contaminant particles from entering is not shown. The leaf springs 550 can be seen to which the holder plate of the touchscreen is fastened. This is moreover connected to pot magnets 610 which are arranged on a bottom side of the holder plate (see FIG. 6). These engage in coils 620 that are arranged on an electronics circuit board 630. By energizing the coils, the pot magnets can be deflected in the direction of a coil axis 621, i.e., perpendicular to the electronics circuit board, or respectively the holder plate 510 to cause haptic feedback on the touchscreen arranged on the side of the holder plate 510 which is not shown, but whose connections of 640 are discernible in FIG. 6. The pot magnets 610 form actuators together with the coils 620. An actuation force acting on the touchscreen can also be measured by these actuators that simultaneously serve as force measuring sensors. When the pot magnets 610 are deflected in the coils 620, they induce current in the coils 620 that can be evaluated to determine the pressure force that led to an acceleration of the touchscreen and thereby the holder plate and pot magnet.

Figure 7:
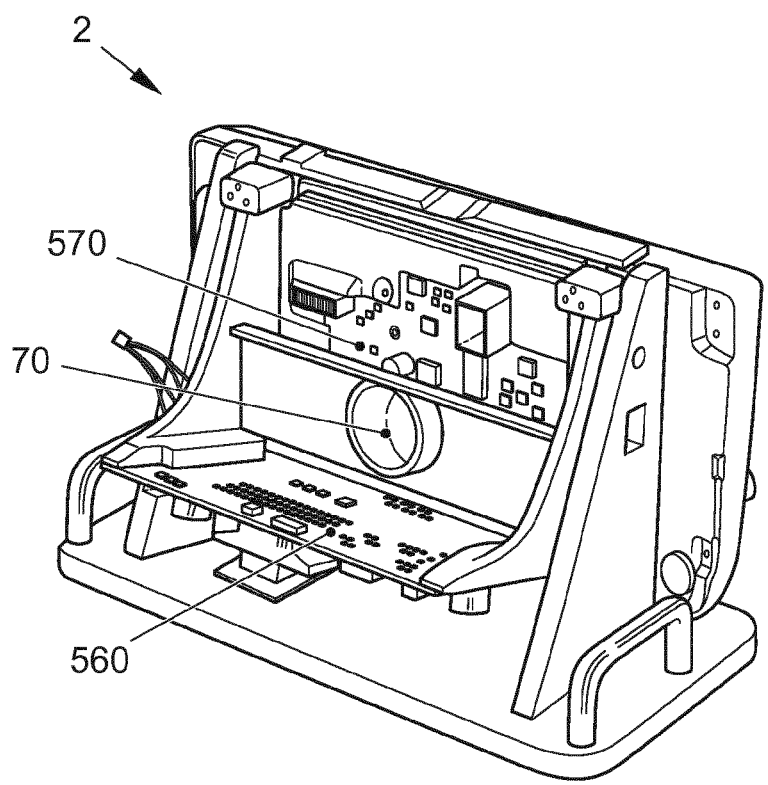
FIG. 7 shows a perspective rear view of an assembled operating apparatus.

FIG. 7 displays a rear view of an assembled operating apparatus 2. The speaker 70, housing components 6 and the printed circuit boards 560, 570 in which the control apparatuses are implemented as described above can be seen.

Figure 8:
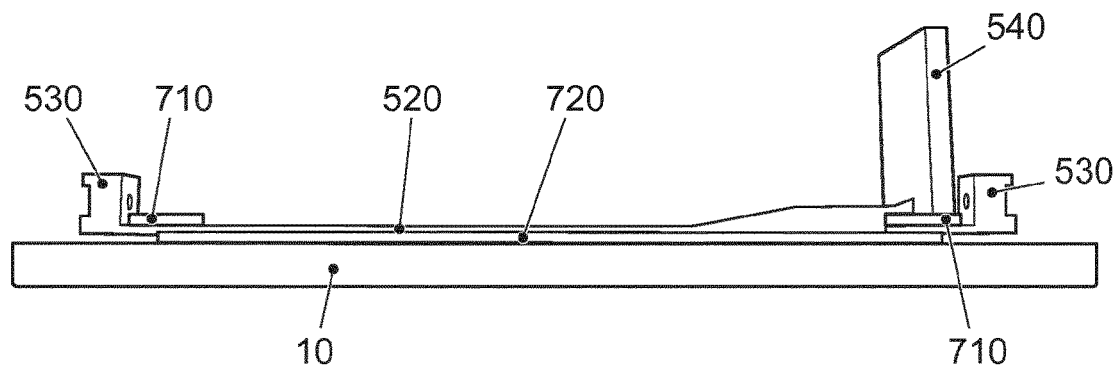
FIG. 8 shows a schematic representation to explain the measurement of force with strain gauges.

FIG. 8 shows an example of a schematic side view of a touchscreen 10 arranged on a touchscreen carrier 520 with an L profile 540.

The touchscreen 10 is connected to the touchscreen carrier 520 for example by an adhesive layer 720. Strain gauges 710 are arranged next to the holding elements 530 and change their properties, in particular their electrical properties, when the touchscreen carrier 520 deforms in the region of the holding elements, and/or the holding elements 530 deform due to an actuation force acting on the touchscreen.

This change in the electronic properties, such as the resistance, is converted by the pressure force measuring apparatus (not shown) into a pressure force signal. The pressure force signal indicates the strength of the detected pressure force. The pressure control apparatus is moreover capable of converting the changes detected in the different strain gauges 710 into a pressure signal.

Figure 9:
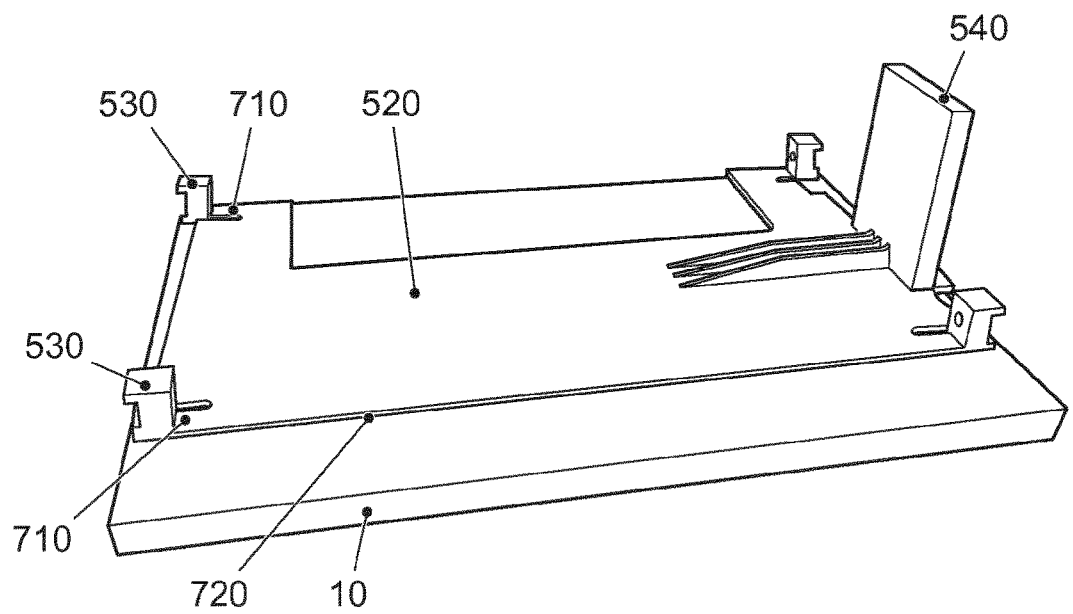
FIG. 9 shows another perspective view to explain the measurement of force with strain gauges.

FIG. 9 shows a perspective view of the touchscreen 10 that is attached to the touchscreen carrier 520, such as by an adhesive layer 720.

Figure 10:
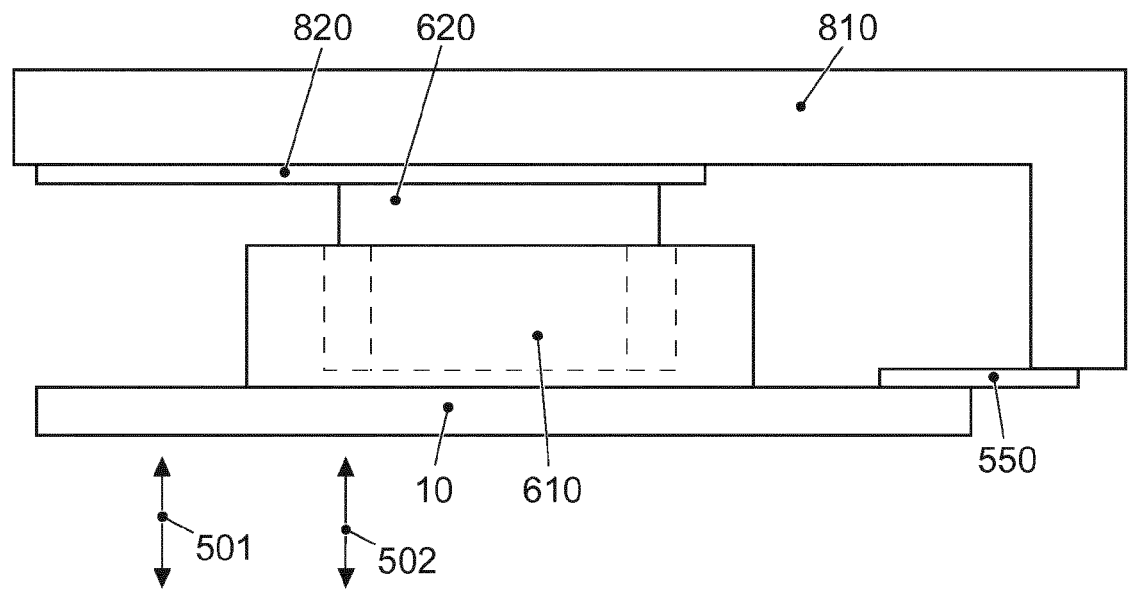
FIG. 10 shows a schematic representation to explain the measurement of force with an inductive measuring procedure.

In FIG. 10, the pressure force detection by an inductive actuator is schematically portrayed again. The touchscreen 10 can be seen that is elastically and movably mounted by leaf springs 550 to a holder frame 810 of the housing 5. A pot magnet 610 is securely connected to the touchscreen 10 and engages in a coil 620 that is connected to an actuator control apparatus on a printed circuit board 820 that simultaneously comprises the pressure measuring control apparatus. The printed circuit board 820 is securely connected to the holding frame 810 so that the coil abuts the holding frame 810 and hence the housing, and can cause a deflection of the touchscreen relative to the housing in the direction of actuation that is indicated by actuation direction arrow 501. The actuator deflection occurs at the same time as indicated by the actuator deflection arrow 502.

Figure 11:
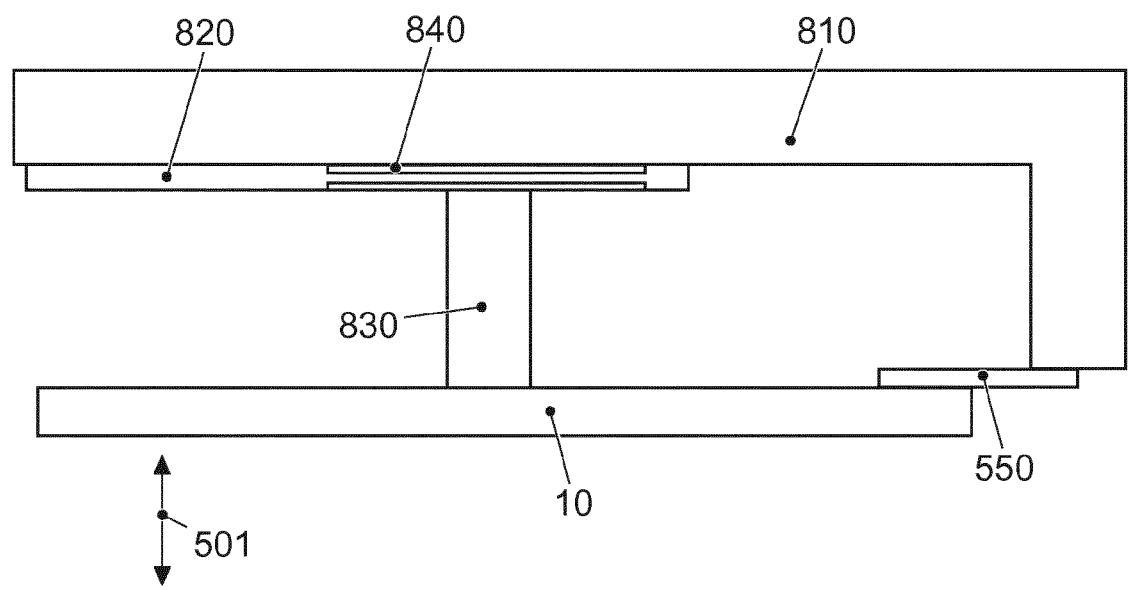
FIG. 11 shows a schematic representation to explain a measurement of force with a plate capacitor.

FIG. 11 schematically portrays another option for detecting the actuation force. Again, the touchscreen 10 is elastically mounted by a leaf spring 550 to a holder frame 810 for a deflection in the actuation direction which is indicated by the actuation direction arrow 501. A plunger 830 is securely connected to the touchscreen 10, or its holding plate or touchscreen carrier (neither are shown). This mechanically acts on a plate capacitor 840 that is designed in a printed circuit board 820 abutting the holder frame 810. If the touchscreen 10 is pressed into the housing 5 in an actuation, the plunger presses against the plate capacitor 840 and accordingly changes a plate distance that in turn changes a capacitance of the plate capacitor 840. The effective pressure force can be derived from this change in capacitance that for example is associated with a change in voltage between the capacitor plates in a charged capacitor.

Figure 12:
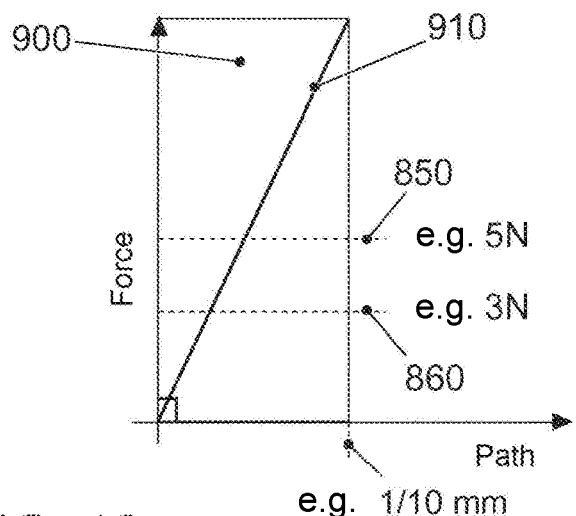
FIG. 12 shows a schematic representation of the required pressure force needed to cause a deflection.

In some embodiments, the touch surface of the touch-sensitive position detection apparatus that is integrated in a touchscreen is mounted in the housing such that an elastic deflection occurs in the actuation direction such that a linear relationship exists between the deflection and the force required therefor. This is plotted in a graph in FIG. 12. The working region 900 of the pressure force measuring apparatus is shown. The required force as a function of the reflection caused thereby is plotted. A slope 910 indicates a stiffness of the force measurement. Embodiments are provided in which the deflection is minimal, for example less than 1/10 mm. Moreover, two force threshold values 850, 860 are marked in FIG. 12. A first force threshold value 850 that is assigned a larger pressure force or actuation force must first be reached or exceeded upon an actuation of a virtual operating element so that the function linked to the virtual operating element can in fact be triggered. When the first force threshold, or respectively the first force threshold value 850 is reached or exceeded, a first haptic feedback, a first haptic acknowledgment, is generated. A second haptic feedback is triggered when the second force threshold, or respectively the second force threshold value 860 is undershot that is assigned less force than the first force threshold value 850. The first haptic feedback and the second haptic feedback are different. In some embodiments, an instigated maximum deflection of the touch surfaces of the touch-sensitive position detection apparatus is greater for the acknowledgment associated with reaching or exceeding the first force threshold than the maximum deflection associated with undershooting the second force threshold. This corresponds to the haptic behavior of a physically designed button. When the second force threshold value 860 is undershot, it is important for a haptic acknowledgment to only be instigated if the first force threshold value 850 has been reached or undershot beforehand.

Figure 13:
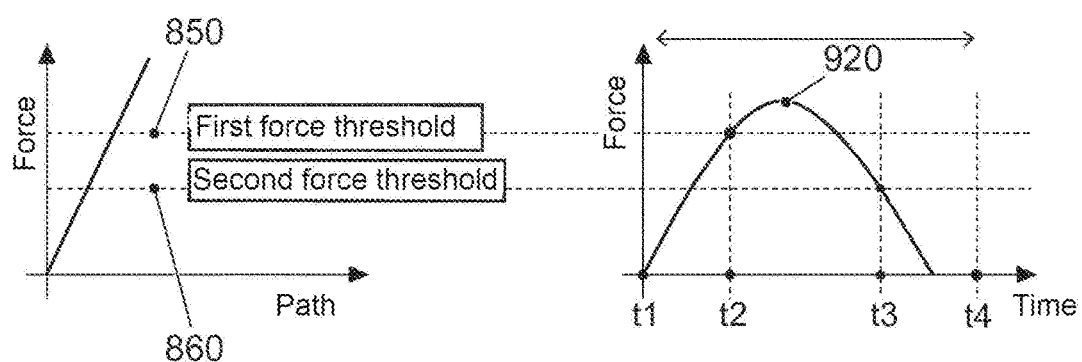
FIG. 13 shows a schematic representation to explain the actuation forces arising during operation plotted against the time, as well as an assignment of the deflection to the arising forces.

FIG. 13 again graphically depicts the pressure force during an actuation process in addition to the graphic representation of the relationship between deflection and the required pressure force. The typical pressure force is plotted against the time as a pressure force curve 920 in an actuation process that leads to the triggering of a function linked to a virtual operating element. At time t1, the user places his actuating element such as his finger on the touch-sensitive position detection apparatus at a position that lies in the trigger range of the corresponding virtual operating element. In some embodiments, this is a position that lies in the region of the graphic representation of the virtual operating element. The user then increases his pressure force until he exceeds the first force threshold value 850 with the actuating force at time t2.

At this time, a first actuator activation signal is generated, and a pulse-like deflection is generated thereby by an actuator as the first haptic acknowledgment at the touch surface. By this, the user notices that he has successfully actuated the virtual operating element and reduces the contact pressure. When the second force threshold, or respectively the second force threshold value 860 is undershot at time t3, a second actuator activation signal is generated, and this instigates a second pulse-like acknowledgment different from the first pulse-like haptic acknowledgment, in some embodiments in the form of another pulse-like deflection of the touch surface. This communicates a haptic feedback to the user as is familiar to him from a physically-designed operating element; at time t4, the user lifts his finger again from the touch surface.

Figure 14:
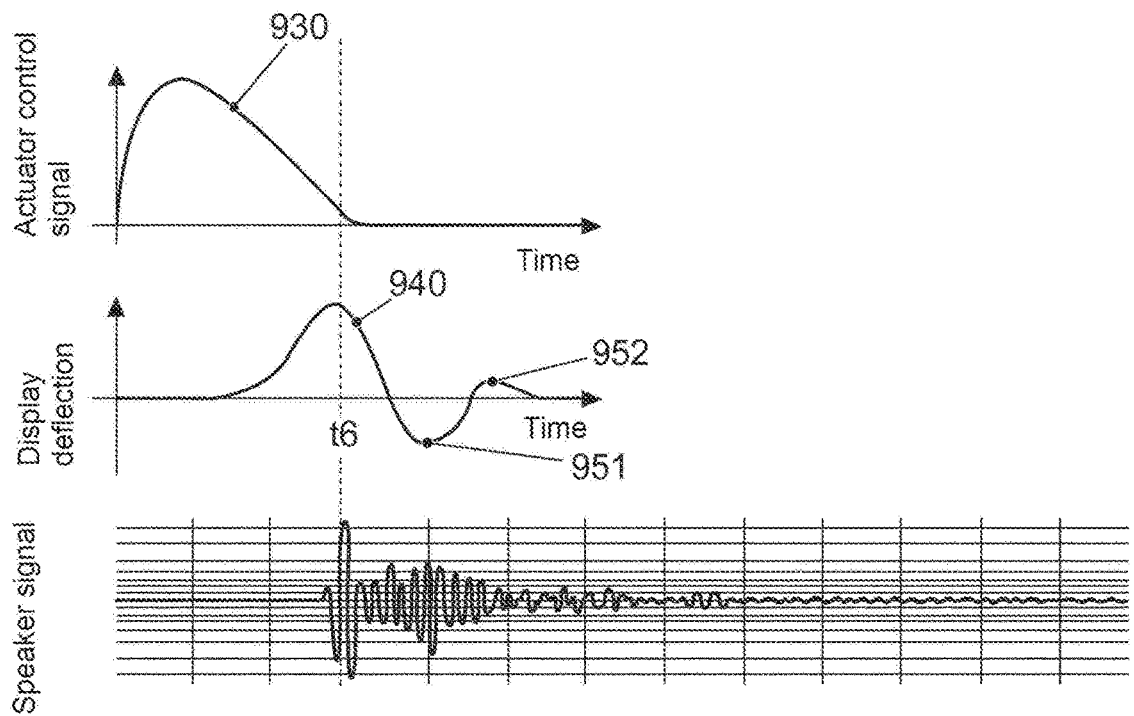
FIG. 14 shows a schematic representation to explain the actuator control signal and the resulting deflection of the touch surface, as well as the temporal synchronization of a sound signal.

In FIG. 14, the control in the form of a control signal 930 and the resulting deflection are both schematically plotted graphically over time. In the top graph, the control signal 930 as is forwarded by the actuator control apparatus to the actuator is plotted over time. It can be seen that a short excitation pulse is generated. In the middle graph, the displayed deflection, i.e., the deflection of the touch surface, is depicted over time. It can be seen that the touch surface deflection reaches a maximum value 955 of a pulse-like deflection 950 at a time t6 at which the control signal 930 has already approached the zero value. Depending on the dampening of the touch surface, or respectively the touchscreen, there are one or two so-called reverberations or overshoots. The emitted speaker signal 960 is depicted in a third graph that represents a short sound pulse. This speaker signal 960 is generated at a delay relative to the control signal 930 of the actuator so that a maximum deflection of the acoustic signal coincides with the maximum deflection of the touch surface.

Figure 15A:
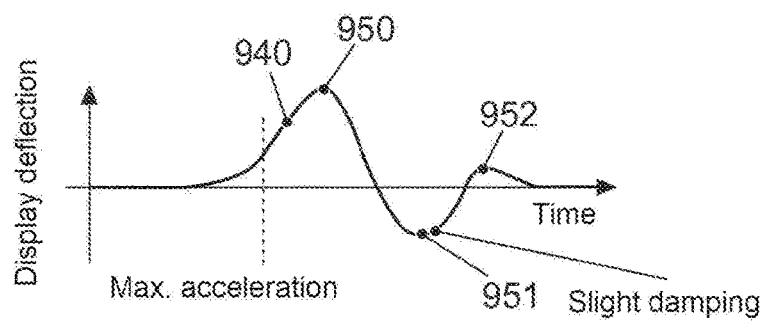
FIG. 15a, 15b show different resulting deflection curves of the touch surface for different dampenings.
Figure 15B:
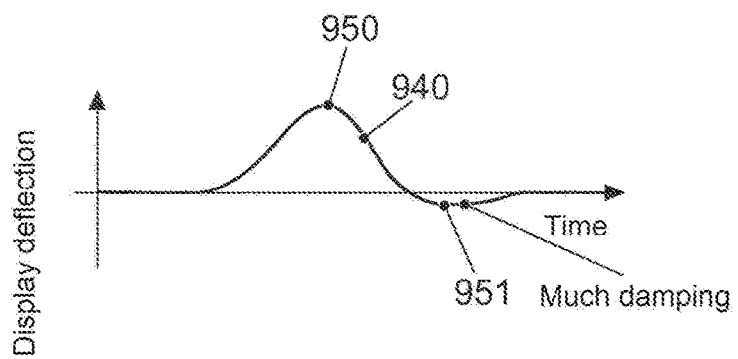

FIGS. 15a and 15b show examples of deflections of the touch surface over time for the same excitation signal as portrayed in FIG. 14. Whereas the mount of the touch surface is only slightly dampened in the embodiment that corresponds with the graph in FIG. 15a so that the above-described overshoots 951, 952 occur, only a slightly pronounced overshoot 951 is observable in addition to the desired pulse-like deflection 950 when there is stronger damping (see FIG. 15b). The deflection behavior that is shown in FIG. 15b corresponds to the deflection behavior.

Figure 16:
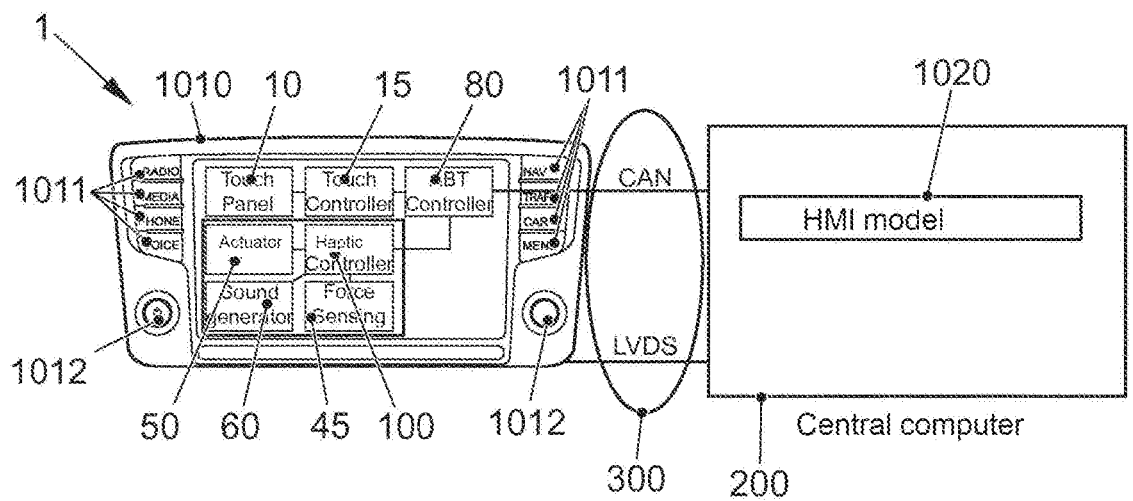
FIG. 16 shows a schematic representation to explain the distribution of control to different control apparatuses.

FIG. 16 schematically displays the operating device 1 with the various control apparatuses that allow a function to be triggered for virtual operating elements with the haptic acknowledgment according to the present discussion. The operating device 1 comprises the operating apparatus with the housing 5 in which other physically-designed operating elements 1010 in the form of buttons 1011 and rotary encoders 1012 are designed in addition to the touchscreen 10. A local operating unit control apparatus 80 is integrated in the housing 5 which, for example, carries out communication with the central computer 200 via one or more buses 300. For example, the control signals, i.e., actuator activation signals, sound activation signals, force threshold trigger signals, force values, etc. can be transmitted via a serial bus such as a CAN bus. CAN in this case stands for controller area network. Graphic information may in some embodiments be transmitted via a LVDS bus. LVDS in this case stands for low voltage differential signaling. Moreover, the operating unit control apparatus 80 is responsible for processing signals from the physically-designed operating elements 1010. Moreover, a touchscreen 10 as well as a touchscreen control apparatus 15 are on or in the housing 5 and comprise the display control apparatus as well as the position detection control apparatus (see FIG. 1). Moreover, there is a haptic control apparatus 100 that is coupled to the pressure measuring control apparatus 45. In addition, the actuator apparatus 50 and a sound generator 60 are coupled to the haptic control apparatus 100 and, as described above, are correspondingly controlled via the haptic control apparatus 100 to generate haptic and acoustic feedback. The haptic control is completely implemented in the control apparatuses locally integrated in the housing.

Figure 17:
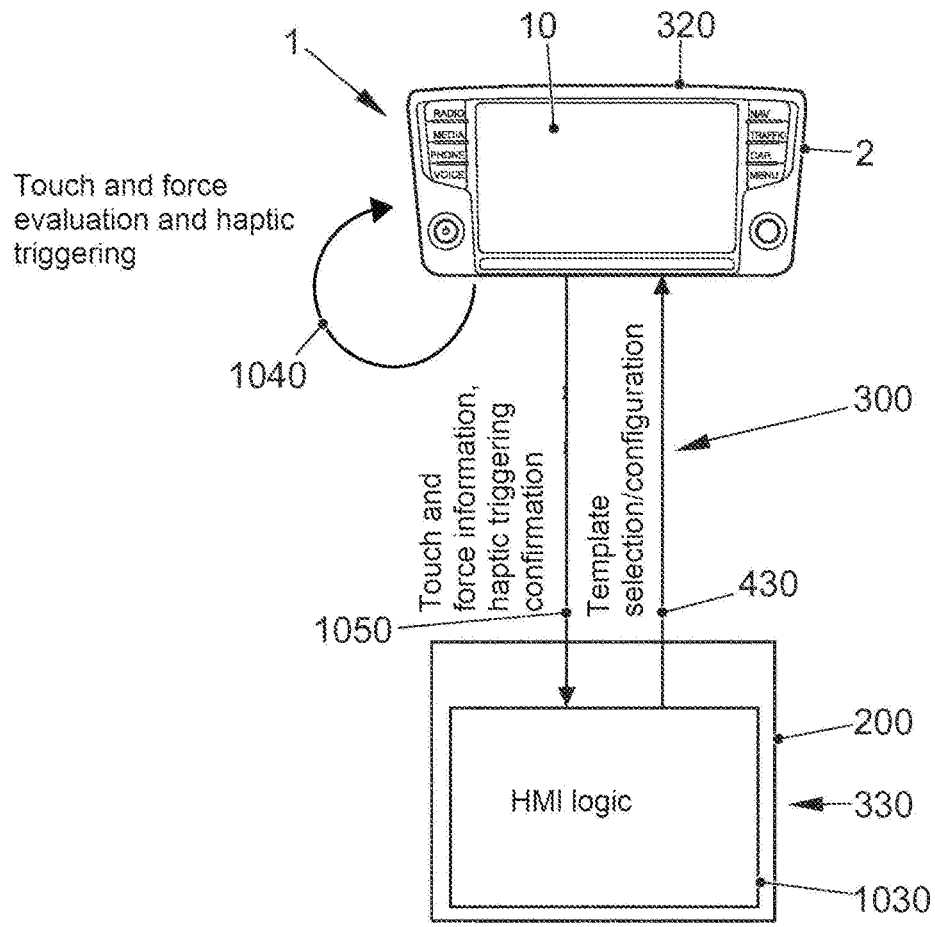
FIG. 17 shows a schematic exemplary embodiment of the operating device.

FIG. 17 displays an exemplary embodiment of the operating device 1. The operating device 1 comprises an operating apparatus 2 designed as a display component 320 and a central control apparatus 330 designed as a central computer 200 which are connected by IT to each other by a bus 300 that can comprise different transmission channels. The haptic control apparatus is designed in the operating apparatus 2 with the touch-sensitive position detection apparatus and the display surface of the programmable display apparatus 20 arranged therebehind which together form a touchscreen 10. The operating logic 1030, which is also termed HMI (human machine interface) logic, is designed in the central computer 200. The central computer 200 transmits the template signal 430 in order to select a current template.

The detected entry parameters are evaluated in the operating apparatus 2 with reference to the trigger conditions of the currently selected template 1040, and haptic and/or acoustic acknowledgments are triggered if applicable. For the evaluation by the operating logic, the HMI logic, the detected entry parameters and in some embodiments also haptic triggering information are forwarded as status information to the operating apparatus 1050. Communication back and forth between the operating apparatus 2 and the central computer 200 is unnecessary during touch actuation in order to enable prompt haptic acknowledgment.

Figure 18:
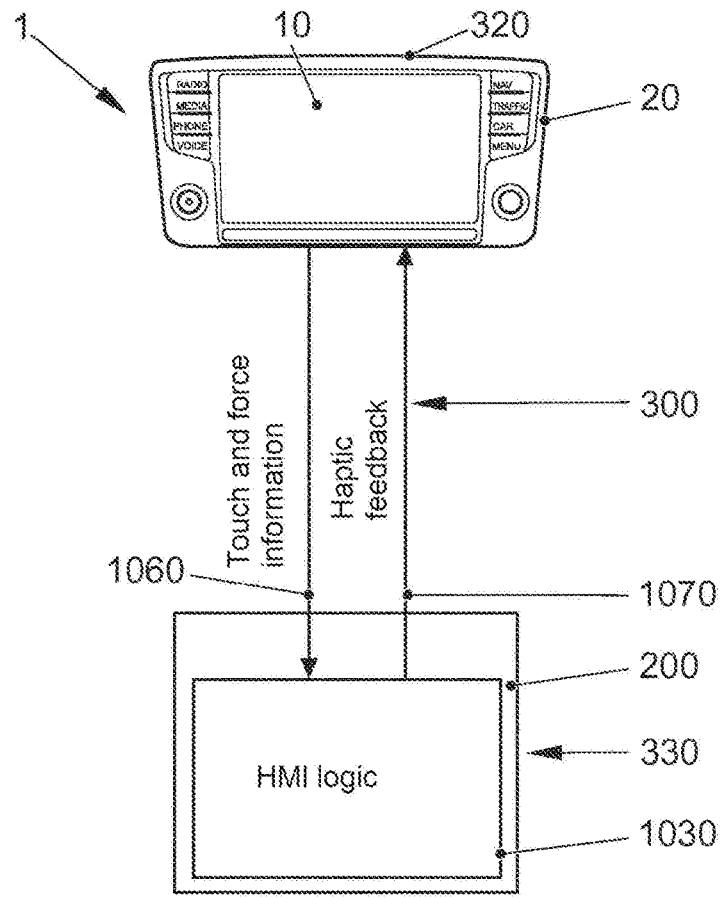
FIG. 18 shows a schematic representation to explain the realization on an operating device in which a complex human-machine interface logic of the central control apparatus takes over haptic triggering.

FIG. 18 schematically portrays an embodiment that is not according to the invention in which the overall control for the haptic feedback is designed in the central computer 200. Touch and force information are transmitted by means of the bus 300 such as a CAN bus 1060 and evaluated in the human/machine interface logic 1030 on the central computer 200 which returns signals for controlling the haptic feedback to the local control apparatuses in the housing around the touchscreen 1070. The transmission of information between the operating apparatus 2 and central computer 200 as well as the evaluation of the central computer 200 with reference to a complex operating logic increases the latency time between the actuation event and haptic acknowledgment.

Figure 19:
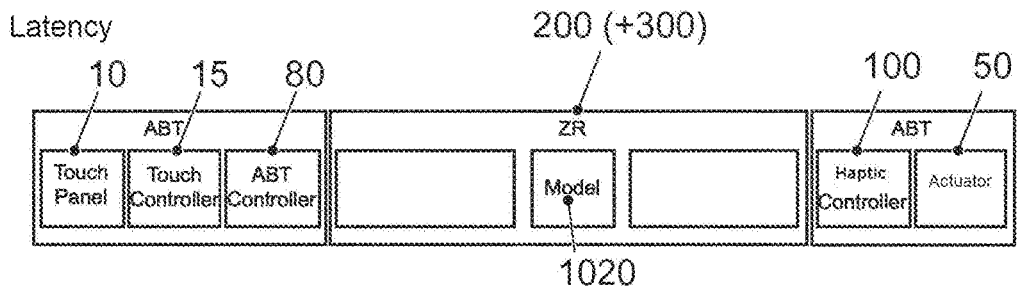
FIG. 19 shows a comparison of the arising latency periods for an embodiment in which the haptic control is realized locally in individual control apparatuses without using a central computer, and a control in which the central computer controls the haptics.
Figure 19:
Figure 19:
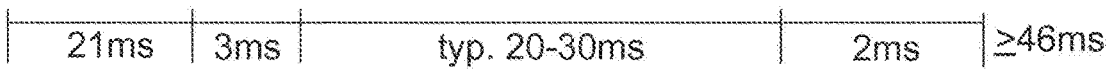

FIG. 19 schematically portrays the latency times below the individually schematically indicated components of the operating device. With the "standalone" version of the present aspect in which the haptic acknowledgment is realized without the central computer, only the processing times occur which are caused by the touchscreen 10 and its touchscreen control apparatus 15 as well as the operating unit control apparatus 80. In addition, times occur that need the haptic control 100 and actuator apparatus 50 in order to generate the haptic acknowledgment signal.

In the alternative embodiment not like in the present aspect in which the haptic control is implemented in the central computer 200, other latency times are added that are needed for the bus transmission and the evaluation in the central computer.

The indicated latency times for the individual components correspond to exemplary embodiments. An acceptable overall latency time that is perceived as not delayed by a user should not fall below 50 ms reaction time between the event of the force threshold undershooting and the haptic feedback.

The process of transmitted messages in an operating procedure for an embodiment not according to the present discussion with a haptic control designed on the central computer will be explained with reference to FIG. 20. First, an initialization message package 1210 is transmitted by the central computer to the local operating apparatus that configures the local operating apparatus. If a touch occurs, the touch position data 1220 is forwarded to the central computer. The pressure force values are also forwarded. So are the force values upon the first force threshold 1230 being exceeded or reached. The central computer 200 performs a logic evaluation 1240 and generates a signal for triggering a first haptic and acoustic acknowledgment 1250. If the second force threshold is undershot, the pressure is again forwarded to the central computer 1260 that, after an additional logic evaluation 1270, transmits signals to a local operating apparatus 1280 to trigger the second haptic effect and the second sound signal. Furthermore, the central computer initiates the triggering of the function 1290 of the function associated with the actuated virtual operating element.

Figure 21:
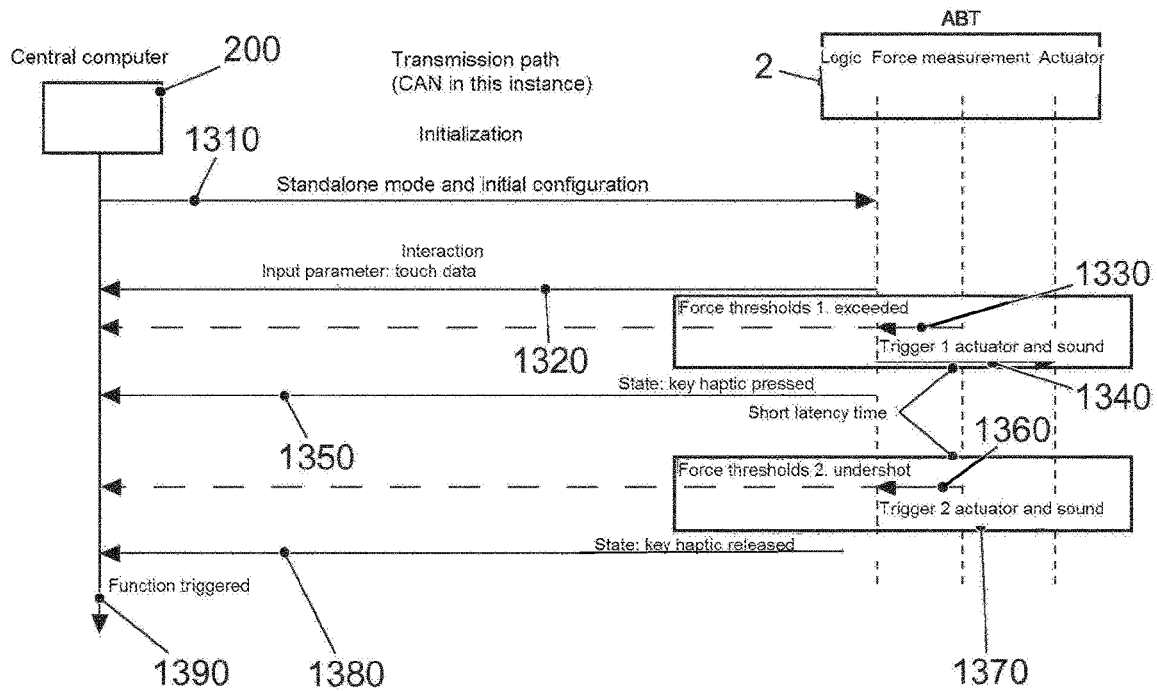
FIG. 21 shows a schematic representation of the messages of an embodiment in which the control of the haptic acknowledgment is realizing in local control apparatuses of the operating apparatus.

FIG. 21 shows the telegram for an embodiment like discussed in which the haptic triggering is executed locally in the local operating apparatus 2. Another initialization 1310 is performed by the central computer 200 with which the local operating apparatus is configured. Determined touch positions are again forwarded to the central computer 1320 when actuation is detected. If the measurement of the pressure force determines that the first force threshold has been exceeded 1330, a first haptic and acoustic acknowledgment is triggered by the haptic control apparatus in the local operating device 1340. As indicated by the dashed line, the force data may in some examples be forwarded to the central computer 200. The central computer is notified 1350 that the virtual operating element has been fully pressed. If the user releases the virtual operating element, the second force threshold is undershot. Once this is known 1360, a second haptic acknowledgment is output through an actuator activation signal and sound activation signal 1370 by the local haptic control apparatus. The central computer is notified 1380 that the user has released the button. The central computer then initiates a function triggering 1390. Undershooting the second force threshold, or respectively the pressure force, may also be forwarded to the central computer 200 as indicated by the dashed line.

Figure 20:
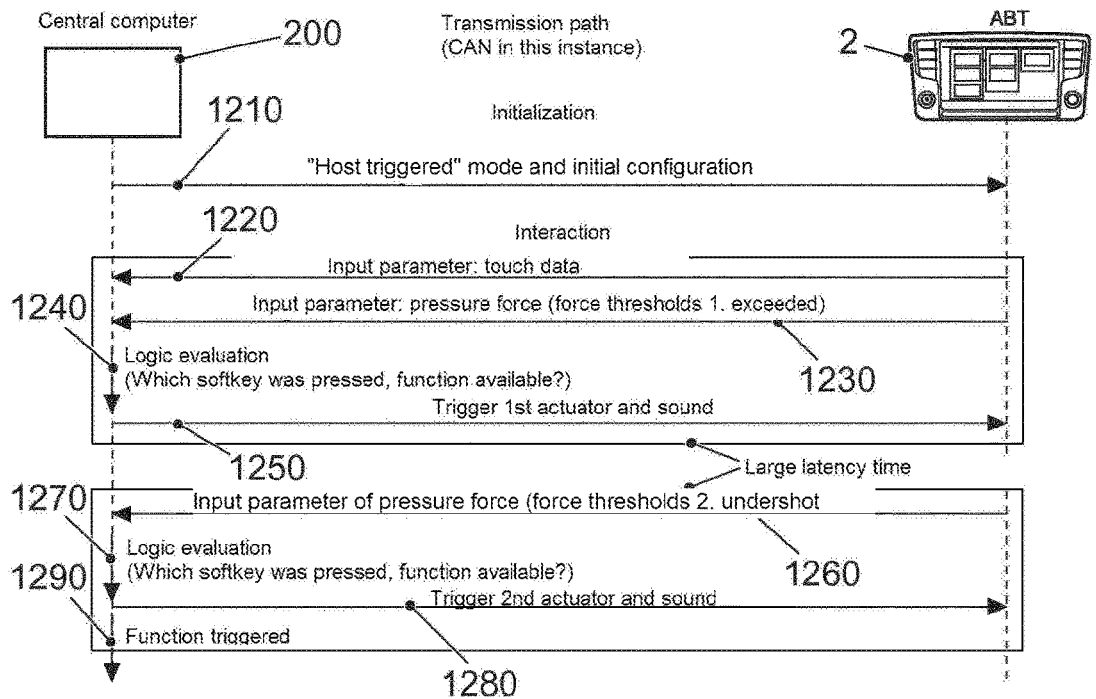
FIG. 20 shows a schematic representation of the exchanged message diagrams in an embodiment in which haptic control is executed by a central computer.

Whereas in the embodiment according to FIG. 20, a transmission of data via the bus, which is generally limited in terms of the transmission bandwidth, is necessary along with processing in the central computer, which may be occupied with the processing time of competing parallel tasks, this is unnecessary in the embodiment according to FIG. 21.

Figure 22:
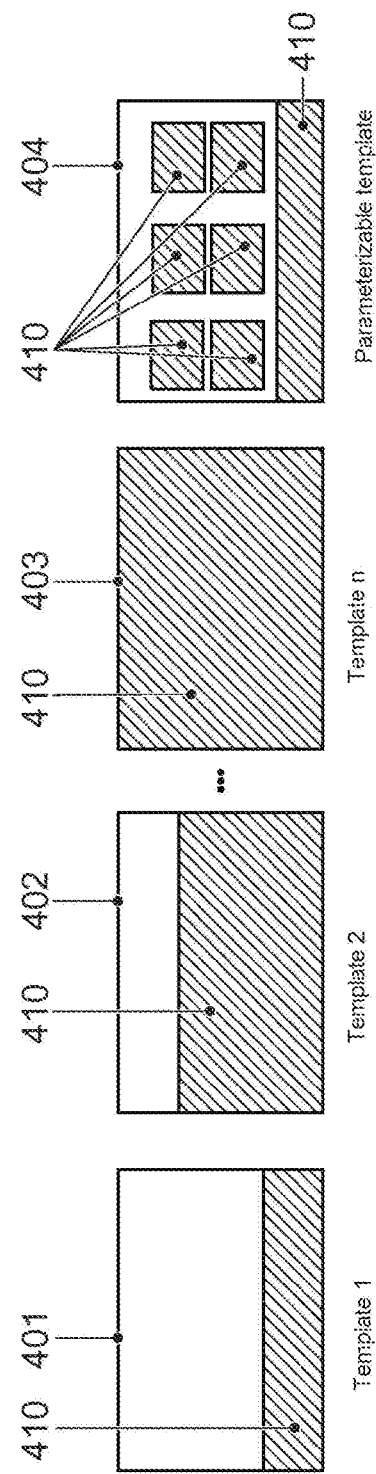
FIG. 22 shows a schematic representation of templates.

FIG. 22 schematically portrays some templates 401 to 404, wherein hatching indicates the trigger regions. At least the template 404 portrayed on the right is dynamically parameterizable.

For a person skilled in the art, various design options of the present technology are consequently possible. It is important for the haptic acknowledgments to be controlled in the operating apparatus independent of the central control apparatus which only performs haptic control indirectly by selecting a template. The haptic acknowledgments are designed as pulses, particularly such that only pulsed deflection from home position is caused, particularly opposite the pressure force by the user.

Moreover, acoustic signals or sounds are output synchronized in time locally next to the touch surface of the operating device so that an origin of the sound of the touch position is assigned based on spatial audio perception, and the entire sensory perception is accordingly improved for a human user in order to imitate a physical button.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

REFERENCE NUMBER LIST

1 Operating device
2 Operating apparatus
3 Motor vehicle
5 Housing
6 Housing components
10 Touchscreen
15 Touchscreen control apparatus 20 Freely programmable display device
21 Display surface
25 Display control apparatus
30 Touch-sensitive position detection apparatus
31 Touch surface
35 Position detection control apparatus
36 Position signal
40 Pressure force measuring apparatus
41 Sensor element
45 Pressure measuring control apparatus
46 Pressure force signal
50 Actuator apparatus
51 Actuator
55 Actuator control apparatus
60 Sound generator
70 Speaker
80 Operating unit control apparatus
100 Haptic control apparatus
106 Actuator activation signal
108 Sound activation signal
133 Memory
136 Comparative result signal (trigger region position)
140 Comparison apparatus
150 Interface
160 Delay apparatus
200 Central computer
210 Central computer interface
300 BUS
320 Display component
330 Central control apparatus
401-404 Templates
410 Trigger region
420 Current template
430 Template signal
501 Actuation direction arrow
502 Actuator deflection direction arrow
510 Holder plate
520 Touchscreen support
530 Holder element
540 L-profile
550 Leaf spring
560 Printed circuit board
570 Printed circuit board
610 Pot magnet
620 Coil
621 Coil axis
630 Electronics circuit board
640 Connections
710 Strain gauge
720 Adhesive layer
810 Holder frame
820 Printed circuit board
830 Plunger
840 Plate capacitor
850 First force threshold value
860 Second force threshold value
900 Working range
910 Slope
920 Pressure force curve
930 Control signal
940 Deflection
950 Pulsed deflection
951 Overshoot
952 Overshoot
960 Speaker signal
t1-t5 Points in time
1010 Physical operating elements
1011 Pushbutton
1012 Rotary encoder
1020 Human/machine model
1030 Human/machine interface logic
1040 Evaluation of entry parameters and haptic triggering
1050 Forwarding of entry parameters and haptic triggering information
1060 Transmitting entry parameters (force and touch information)
1070 Transmitting haptic control signals
1210 Initialization
1220 Forwarding touch position data
1230 Forwarding exceeding of the first force threshold
1240 Logic evaluation
1250 Triggering of first acknowledgment
1260 Forwarding under shooting of second force threshold
1270 Additional logic evaluation
1280 Triggering of second acknowledgment
1290 Function triggering
1310 Initialization
1320 Forwarding touch position data
1330 Detecting exceeding of the first force threshold
1340 Triggering of first acknowledgment
1350 Forwarding exceeding of the first force threshold (virtual operating element completely pressed)
1360 Recognition of undershooting of second force threshold
1370 Triggering of second acknowledgment
1380 Forwarding under shooting of second force threshold
1390 Function triggering

The invention claimed is:

1. An operating device for a vehicle with haptic acknowledgment, comprising:
a touch-sensitive position detection apparatus with a touch surface for determining touch positions as entry parameters on a touch surface of the touch-sensitive position detection apparatus;
an actuator apparatus coupled to the touch-sensitive position detection apparatus and comprising at least one actuator for generating the haptically detectable acknowledgment on the touch surface; and
a central control apparatus with operating logic circuitry, wherein the operating logic circuitry configured to execute a triggering of at least one of functions and vehicle systems depending on detected entry parameters, wherein
the touch-sensitive position detection apparatus and the actuator apparatus are configured with a haptic control apparatus in an operating apparatus,
the central control apparatus is provided separately from the operating apparatus and is coupled to the operating apparatus, and
detected entry parameters are forwarded to the haptic control apparatus, wherein
the haptic control apparatus comprises a memory apparatus in which a plurality of different templates are saved, wherein the plurality of templates each comprise at least one trigger condition for a haptic acknowledgment, and
the operating logic circuitry is configured to transmit a template signal for selecting or generating a current template to the haptic control apparatus, and wherein the haptic control apparatus comprises a comparison apparatus, which compares the detected entry parameters touched during a user entry in the operating apparatus with the at least one trigger condition of the current template in order to determine whether the detected entry parameters satisfy the at least one trigger condition, and the haptic control apparatus is configured to control the actuator apparatus for generating the haptic acknowledgment via the at least one actuator if the comparison apparatus has identified the fulfillment of the at least one trigger condition.

2. The operating device according to claim 1, wherein the at least one trigger condition comprises at least one area definition for a trigger region, and the comparison apparatus is designed to only determine the fulfillment of the at least one trigger condition when, in comparing the detected entry parameter with the at least one trigger condition, it is determined that the touch position detected as an entry parameter lies within the trigger region of the trigger condition.

3. The operating device according to claim 1, wherein a pressure force measuring apparatus is coupled to the touch surface in the operating apparatus, which pressure force measuring apparatus comprises a sensor for detecting a pressure force exerted from the touch actuation of the touch surface as one of the entry parameters, and the at least one trigger condition comprises at least one pressure force instruction, and the comparison device is designed to only identify the fulfillment of the at least one trigger condition when it is determined that the pressure force detected as the entry parameter fulfills the pressure force instruction in a comparison of detected entry parameters with the at least one trigger condition.

4. The operating device according to claim 1, wherein at least one of the plurality of templates comprises at least one additional trigger condition different from the at least one trigger condition, in addition to the at least one trigger condition, wherein the different trigger conditions are linked to different haptic acknowledgments, wherein the different haptic acknowledgments cause different haptic impressions in the user at the touch surface.

5. The operating device according to claim 3, wherein the at least one trigger condition comprises a temporal specification that comprises a specification for the entry parameters detected at different times, and the comparison apparatus is designed to compare the entry parameters detected at different times with the specification of the temporal specification, and to identify the fulfillment of the at least one trigger condition upon comparing the detected entry parameters with the at least one trigger condition, only when the entry parameters detected at different times fulfill the specification of the temporal specification at the different times.

6. The operating device according to claim 1, wherein the operating apparatus and the central control apparatus are linked by a serial data bus to forward the detected entry parameters and transmit the template signal.

7. A method for detecting user entries for controlling or triggering one or more of functions and vehicle systems by touch-actuating a touch surface of a touch-sensitive position detection device, comprising the following steps:
   detection of entry parameters upon the touch actuation of the touch surface of a touch-sensitive position detection apparatus,
   evaluation of the detected entry parameters with reference to operating logic circuitry that instigates a triggering of one or more of the functions and the vehicle systems depending on the detected entry parameters, and
   generation of haptic acknowledgment at the touch surface when a user entry is detected, wherein the detection of the entry parameters is conducted by an operating apparatus that is provided separate from a central control apparatus which is coupled to the operating apparatus, and the evaluation by the operating logic circuitry occurs in the central control apparatus, wherein a template signal is transmitted by the central control apparatus to the haptic control apparatus of the operating apparatus according to which one of several templates of the haptic control apparatus is selected as a current template, or the current template is generated, wherein a template comprises at least one trigger condition for a haptic acknowledgment, and the entry parameters detected on or in the operating apparatus are forwarded to a haptic control apparatus in the operating apparatus, and the detected entry parameters are compared with the at least one trigger condition in the haptic control apparatus in order to determine whether the detected entry parameters satisfy the at least one trigger condition, and the haptic control apparatus controls the actuator apparatus to generate the haptic acknowledgment when the comparison of the entry parameters with the at least one trigger condition indicates that the at least one trigger condition is fulfilled.

8. The method according to claim 7, wherein a touch position is detected as an entry parameter, and the at least one trigger condition comprises at least one area definition for a trigger region, and the fulfillment of the at least one trigger condition is only identified when, in the comparison of the detected entry parameter with the at least one trigger condition, it is determined that the touch position detected as the entry parameter lies within the trigger region of the trigger condition.

9. The method according to claim 7, wherein a pressure force exerted from the touch actuation of touch surface is detected by means of a pressure force measuring apparatus coupled to a touch surface in the operating apparatus as one of the entry parameters, and the at least one trigger condition comprises at least one pressure instruction, and the fulfillment of the at least one trigger condition is only identified when the pressure force detected as the entry parameter fulfills the pressure force instruction.

10. The method according to claim 7, wherein one of the plurality of templates comprises at least one additional trigger condition different from the at least one trigger condition in addition to the at least one trigger condition, wherein the different trigger conditions are linked to different haptic acknowledgments, and the different haptic acknowledgments cause different haptic impressions in a user in the touch surface, and the detected entry parameters are compared with the different trigger conditions, and different haptic acknowledgments are accordingly generated depending on which of the trigger conditions is fulfilled.

11. The method according to claim 9, wherein the at least one trigger condition comprises a temporal specification that comprises a specification for the entry parameters detected at different times, and the entry parameters detected at different times are compared with the specification of the temporal specification, and the fulfillment of the at least one trigger condition is identified only, when upon comparing the detected entry parameters with one of the trigger conditions, the entry parameters detected at different times fulfill the specification of temporal instruction at the different times.

12. The method according to claim 7, wherein the template signal is generated so that at least one trigger condition for a current instruction is modified or generated in the haptic control apparatus using forwarded operating parameters so that the at least one trigger condition is adapted to a current operating context.

13. The method according to claim 7, wherein the various templates are saved in a memory apparatus of the haptic control apparatus, and the current template is selected by forwarding an identifier to the operating apparatus which identifies one of the templates.

14. The method according to claim 7, wherein at least one template is parameterized, and condition parameters are transmitted in addition to an identifier, which identifier is identifying the current template.

15. The method according to claim 7, wherein an acoustic signal is output with the haptic acknowledgment in the operating apparatus.

16. The operating device according to claim 4, wherein at least one of the at least one trigger condition and the at least one additional trigger condition comprises a temporal specification that comprises a specification for the entry parameters detected at different times, and the comparison apparatus is designed to compare the entry parameters detected at different times with the specification of the temporal specification, and to identify the fulfillment of at least one of the at least one trigger condition, and the least one additional trigger condition, upon comparing the detected entry parameters with one of the trigger conditions, only when the entry parameters detected at different times fulfill the specification of the temporal specification at the different times.

17. The method according to claim 10, wherein at least one of the at least one trigger condition and the at least one additional trigger condition comprise a temporal specification that comprises a specification for the entry parameters detected at different times, and the entry parameters detected at different times are compared with the specification of the temporal specification, and the fulfillment of at least one of the at least one trigger condition, and the least one additional trigger condition, is identified only, when upon comparing the detected entry parameters with one of the trigger conditions, the entry parameters detected at different times fulfill the specification of the temporal specification at the different times.

* * * * *